US012598470B2

(12) United States Patent
Amick et al.

(10) Patent No.: US 12,598,470 B2
(45) Date of Patent: Apr. 7, 2026

(54) USING SUBSCRIBER IDENTITY MODULE (SIM) CARD AS A SECURITY KEY FOR SIM SWAP FRAUD PREVENTION

(71) Applicant: T-Mobile Innovations LLC, Overland Park, KS (US)

(72) Inventors: Hugh Tyler Amick, Seattle, WA (US); Sean Patrick Hoelzle, Collegeville, PA (US); Deepak Jaiswal, Redmond, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 52 days.

(21) Appl. No.: 18/801,586

(22) Filed: Aug. 12, 2024

(65) Prior Publication Data

US 2026/0046628 A1      Feb. 12, 2026

(51) Int. Cl.
| | |
|---|---|
| *H04W 12/06* | (2021.01) |
| *H04W 12/126* | (2021.01) |
| *H04W 12/72* | (2021.01) |

(52) U.S. Cl.
CPC ......... *H04W 12/72* (2021.01); *H04W 12/068* (2021.01); *H04W 12/126* (2021.01)

(58) Field of Classification Search
CPC . H04W 12/72; H04W 12/068; H04W 12/126; H04W 8/183; H04W 8/205; H04W 12/35
See application file for complete search history.

(56) References Cited

U.S. PATENT DOCUMENTS

| | | | |
|---|---|---|---|
| 8,175,589 B2 * | 5/2012 | Montaner Gutierrez | .................... H04W 4/14 455/418 |
| 8,306,571 B2 * | 11/2012 | Larsson | ................ H04M 15/70 455/433 |
| 8,463,239 B1 | 6/2013 | Koller et al. | |
| 8,467,770 B1 | 6/2013 | Ben Ayed | |

(Continued)

FOREIGN PATENT DOCUMENTS

WO      2016050990 A1      4/2016

OTHER PUBLICATIONS

Ekeh et al., Awareness of BVN, SIM Swap and Clone Frauds: Methods and Controls, Science World Journal, 2022.*

(Continued)

*Primary Examiner* — David Garcia Cervetti

(57) ABSTRACT

A method of utilizing a SIM card as a security key for subscriber identity module (SIM) swap prevention is described. The method includes receiving, from a service provider, an initial one-time password (OTP) delivery request comprising an OTP message, a mobile station international subscriber directory number (MSISDN) destined to receive the OTP message, and a SIM indicator associated with the MSISDN; determining, based on the OTP delivery request, a current international mobile subscriber identity (IMSI) associated with the MSISDN; obtaining, from a datastore based on the SIM indicator associated with the MSISDN, an IMSI of record for the MSISDN; comparing the current IMSI associated with the MSISDN and the IMSI of record for the MSISDN; and determining, based on the comparing, whether to deliver the OTP message to the MSISDN or block delivery of the OTP message to the MSISDN.

20 Claims, 10 Drawing Sheets

(56)  References Cited

U.S. PATENT DOCUMENTS

| | | | |
|---|---|---|---|
| 8,954,113 B2 * | 2/2015 | Hauck | H04W 8/265 |
| | | | 455/558 |
| 9,369,938 B2 * | 6/2016 | Biggs | H04W 12/06 |
| 9,532,208 B2 * | 12/2016 | Camilleri | H04W 8/26 |
| 9,699,660 B1 * | 7/2017 | Blatt | H04W 12/126 |
| 9,749,862 B1 * | 8/2017 | Selvaraj | H04W 8/183 |
| 10,075,848 B2 * | 9/2018 | Velusamy | H04W 12/126 |
| 10,178,223 B1 * | 1/2019 | Marimuthu | H04B 1/3816 |
| 10,277,586 B1 * | 4/2019 | Yau | H04L 63/0807 |
| 10,349,267 B1 * | 7/2019 | Chen | H04W 4/60 |
| 10,433,156 B1 * | 10/2019 | Long | H04W 8/205 |
| 10,530,756 B1 | 1/2020 | Youngs et al. | |
| 10,623,961 B1 * | 4/2020 | Manepalli | H04W 12/06 |
| 10,715,996 B1 * | 7/2020 | Singh | G06Q 20/0855 |
| 10,743,181 B1 * | 8/2020 | Selvaraj | H04W 12/45 |
| 10,904,741 B2 * | 1/2021 | Chen | H04B 1/3816 |
| 11,076,296 B1 * | 7/2021 | Kant | H04W 12/72 |
| 11,368,849 B1 * | 6/2022 | Reeves | H04W 12/67 |
| 11,706,629 B2 * | 7/2023 | Reeves | H04W 12/67 |
| | | | 726/26 |
| 11,902,786 B1 * | 2/2024 | Sharma | H04W 12/35 |
| 11,985,507 B2 | 5/2024 | Reeves et al. | |
| 12,028,933 B1 * | 7/2024 | An | H04W 8/205 |
| 12,177,751 B1 * | 12/2024 | Hadadi | H04W 8/183 |
| 12,238,525 B2 * | 2/2025 | Daumer | H04W 4/14 |
| 2003/0196106 A1 * | 10/2003 | Erfani | G06Q 20/341 |
| | | | 380/28 |
| 2004/0229601 A1 * | 11/2004 | Zabawskyj | H04W 76/15 |
| | | | 455/414.1 |
| 2005/0063570 A1 | 3/2005 | Kim | |
| 2008/0312968 A1 | 12/2008 | Hannon et al. | |
| 2009/0006230 A1 * | 1/2009 | Lyda | G06Q 20/4016 |
| | | | 705/35 |
| 2009/0007275 A1 | 1/2009 | Gehrmann | |
| 2009/0327398 A1 * | 12/2009 | Campbell | H04W 8/245 |
| | | | 709/202 |
| 2010/0210305 A1 * | 8/2010 | Larsson | H04W 8/265 |
| | | | 455/558 |
| 2011/0078773 A1 * | 3/2011 | Bhasin | H04W 12/068 |
| | | | 726/5 |
| 2013/0288749 A1 * | 10/2013 | Torres | H04L 12/1432 |
| | | | 455/558 |
| 2015/0038120 A1 * | 2/2015 | Larkin | H04W 12/04 |
| | | | 455/411 |
| 2016/0007190 A1 * | 1/2016 | Wane | H04W 84/042 |
| 2016/0021532 A1 | 1/2016 | Schenk et al. | |
| 2016/0050554 A1 * | 2/2016 | Ben Shlush | H04W 12/06 |
| | | | 455/411 |

| | | | |
|---|---|---|---|
| 2016/0307199 A1 | 10/2016 | Patel et al. | |
| 2017/0094500 A1 * | 3/2017 | Zhong | H04B 1/3816 |
| 2017/0208540 A1 | 7/2017 | Egner et al. | |
| 2017/0272972 A1 | 9/2017 | Egner et al. | |
| 2018/0063708 A1 * | 3/2018 | Shi | H04L 63/0853 |
| 2018/0176767 A1 * | 6/2018 | Hjelt | H04W 12/04 |
| 2018/0302227 A1 | 10/2018 | Seegebarth | |
| 2020/0236595 A1 * | 7/2020 | Cuevas Ramirez | H04W 8/18 |
| 2020/0236603 A1 * | 7/2020 | Cuevas Ramirez | H04W 8/12 |
| 2020/0245142 A1 * | 7/2020 | Manepalli | H04L 63/102 |
| 2021/0076204 A1 * | 3/2021 | Goyal | H04L 67/306 |
| 2021/0165426 A1 | 6/2021 | White | |
| 2021/0195411 A1 * | 6/2021 | Ratnakaram | H04L 63/0853 |
| 2022/0012743 A1 | 1/2022 | Snell et al. | |
| 2022/0129900 A1 * | 4/2022 | Naujok | H04W 4/029 |
| 2022/0141669 A1 * | 5/2022 | Daumer | H04L 63/1483 |
| | | | 726/23 |
| 2022/0167152 A1 * | 5/2022 | Uy | H04W 12/043 |
| 2022/0248233 A1 | 8/2022 | Reeves et al. | |
| 2022/0400384 A1 * | 12/2022 | Byrne | H04W 12/126 |
| 2023/0054006 A1 * | 2/2023 | Naujok | H04W 12/03 |
| 2023/0284012 A1 * | 9/2023 | Voruganti | H04W 12/0471 |
| | | | 455/411 |
| 2023/0396980 A1 * | 12/2023 | Kanchiraju | H04W 8/183 |
| 2024/0015515 A1 * | 1/2024 | Jaiswal | H04W 12/126 |
| 2024/0040495 A1 * | 2/2024 | Pratt | H04W 12/06 |
| 2024/0171558 A1 * | 5/2024 | Diffloth | H04L 63/08 |
| 2024/0323681 A1 * | 9/2024 | Sikes | H04W 12/069 |
| 2024/0365126 A1 * | 10/2024 | Dunn | H04L 9/3257 |
| 2024/0381093 A1 * | 11/2024 | Murakami | H04W 12/122 |
| 2025/0024264 A1 * | 1/2025 | Opedal | H04W 12/72 |
| 2025/0056201 A1 * | 2/2025 | Liang | H04W 8/205 |
| 2025/0139209 A1 * | 5/2025 | Hassan | G06F 21/31 |
| 2025/0220567 A1 * | 7/2025 | Pratt | H04W 12/06 |
| 2025/0247704 A1 * | 7/2025 | Shah | H04W 8/24 |

OTHER PUBLICATIONS

Restriction Requirement dated Dec. 9, 2021 U.S. Appl. No. 17/081,813, filed Oct. 27, 2020.
Notice of Allowance dated Feb. 24, 2022, U.S. Appl. No. 17/081,813, filed Oct. 27, 2020.
Restriction Requirement dated Oct. 11, 2022 U.S. Appl. No. 17/725,487, filed Apr. 20, 2022.
Office Action dated Dec. 16, 2022 U.S. Appl. No. 17/725,487, filed Apr. 20, 2022.
Notice of Allowance dated Mar. 2, 2023 U.S. Appl. No. 17/725,487, filed Apr. 20, 2022.
Notice of Allowance dated Jan. 23, 2024 U.S. Appl. No. 18/324,837, filed May 26, 2023.

* cited by examiner

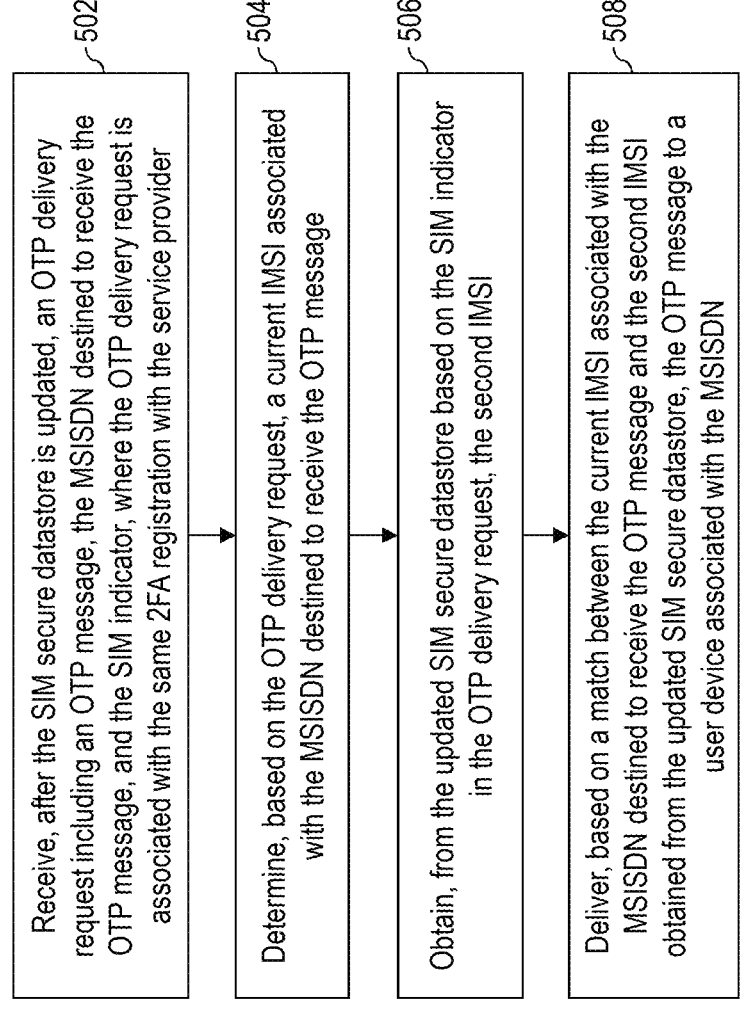

500

502

Receive, after the SIM secure datastore is updated, an OTP delivery request including an OTP message, the MSISDN destined to receive the OTP message, and the SIM indicator, where the OTP delivery request is associated with the same 2FA registration with the service provider

504

Determine, based on the OTP delivery request, a current IMSI associated with the MSISDN destined to receive the OTP message

506

Obtain, from the updated SIM secure datastore based on the SIM indicator in the OTP delivery request, the second IMSI

508

Deliver, based on a match between the current IMSI associated with the MSISDN destined to receive the OTP message and the second IMSI obtained from the updated SIM secure datastore, the OTP message to a user device associated with the MSISDN

FIG. 5

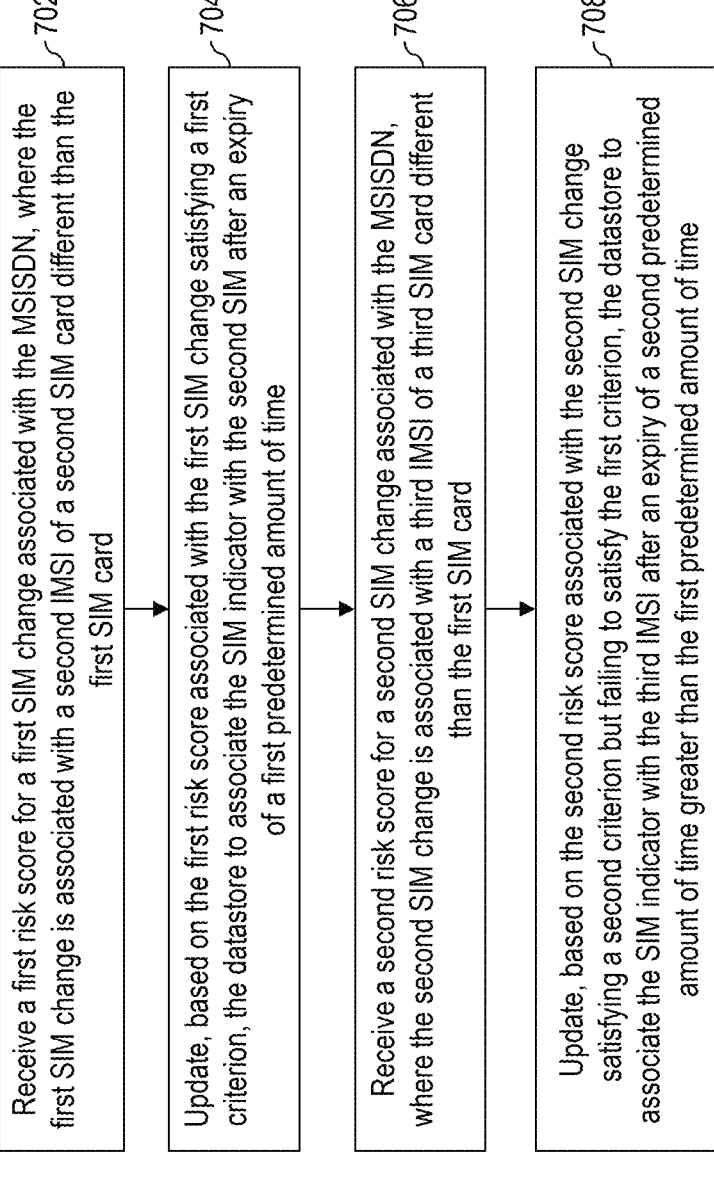

Receive a first risk score for a first SIM change associated with the MSISDN, where the first SIM change is associated with a second IMSI of a second SIM card different than the first SIM card ⌒702

Update, based on the first risk score associated with the first SIM change satisfying a first criterion, the datastore to associate the SIM indicator with the second SIM after an expiry of a first predetermined amount of time ⌒704

Receive a second risk score for a second SIM change associated with the MSISDN, where the second SIM change is associated with a third IMSI of a third SIM card different than the first SIM card ⌒706

Update, based on the second risk score associated with the second SIM change satisfying a second criterion but failing to satisfy the first criterion, the datastore to associate the SIM indicator with the third IMSI after an expiry of a second predetermined amount of time greater than the first predetermined amount of time ⌒708

USING SUBSCRIBER IDENTITY MODULE (SIM) CARD AS A SECURITY KEY FOR SIM SWAP FRAUD PREVENTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A subscriber identity module (SIM) is a component of a user equipment (UE) that can store data, such as a unique serial number associated with the SIM, an international mobile subscriber identity (IMSI) number, security authentication data, contact data, capability data, service data, and/or the like. In some examples, a SIM can be an integrated circuit (e.g., a "SIM card") that can be inserted and removed from a UE. In some examples, a SIM can be an embedded-SIM (eSIM), which can be a programmable SIM that is embedded directly into a UE. In some examples, user accounts associated with SIMs can be vulnerable to fraudulent attacks. For example, malicious actors can impersonate subscribers to perform SIM swaps. This can result in undesirable disclosure of information, detrimental utilization of user accounts, and/or unauthorized transfers of funds.

SUMMARY

In an embodiment, a method implemented in a communications system to utilize a subscriber identity module (SIM) card at a user device as a security key for SIM swap fraud prevention is disclosed. The method comprises receiving, by a SIM secure application at a computing system comprising a service delivery gateway (SDG) of the communications system, from a service provider, an initial one-time password (OTP) delivery request comprising an initial OTP message, a mobile station international subscriber directory number (MSISDN) destined to receive the initial OTP message, and a request for a SIM indicator associated with the MSISDN, wherein the initial OTP delivery request is based on a registration of the MSISDN for second factor authentication (2FA) with the service provider; delivering, by the SIM secure application, the initial OTP message to a user device associated with the MSISDN; determining, by the SIM secure application based on the delivering, an international mobile subscriber identity (IMSI) of a SIM card in the user device associated with the MSISDN; obtaining, by the SIM secure application, based on the determined IMSI, from a datastore comprising a plurality of SIM indicators, each in association with an IMSI of record for a respective MSISDN, a first SIM indicator of the plurality of SIM indicators; transmitting, by the SIM secure application to the service provider, a delivery report including the first SIM indicator and an indication of a successful delivery of the initial OTP message; receiving, by the SIM secure application from the service provider, a subsequent OTP delivery request comprising a subsequent OTP message, the MSISDN destined to receive the subsequent OTP message, and the first SIM indicator; determining, by the SIM secure application based on the subsequent OTP delivery request, a current IMSI associated with the MSISDN destined to receive the subsequent OTP message; obtaining, by the SIM secure application, from the datastore based on the first SIM indicator in the subsequent OTP delivery request, an IMSI of record for the MSISDN destined to receive the subsequent OTP message; comparing, by the SIM secure application, the current IMSI associated with the MSISDN destined to receive the subsequent OTP message and the IMSI of record for the MSISDN destined to receive the subsequent OTP message; and determining, by the SIM secure application, based on the comparing, whether to deliver the subsequent OTP message to the MSISDN or block delivery of the subsequent OTP message to the MSISDN.

In another embodiment, a communications system to provide subscriber identity module (SIM) swap fraud prevention without a two-factor authentication (2FA) re-registration upon a legitimate SIM change is disclosed. The system comprises a datastore to store a SIM indicator in association with a first international mobile subscriber identity (IMSI) recorded for a mobile station international subscriber directory number (MSISDN), wherein the first IMSI is associated with a first SIM card, wherein the SIM indicator and the MSISDN are associated with a 2FA registration with a service provider; a first network node comprising at least one first processor; at least one first non-transitory memory; and a SIM management application comprising instructions stored at the at least one first non-transitory memory, which when executed by the at least one first processor, causes the SIM management application to determine that a level of risk for a SIM change associated with the MSISDN satisfies a threshold, wherein the SIM change is further associated with a second IMSI of a second SIM card different than the first SIM card; and update, based on the determining, the datastore to associate the SIM indicator with the second IMSI, a second network node comprising at least one second processor; at least one second non-transitory memory; and a SIM secure application comprising instructions stored at the at least one second non-transitory memory, which when executed by the at least one second processor, causes the SIM secure application to receive, from the service provider after the datastore is updated, an OTP delivery request comprising an OTP message, the MSISDN destined to receive the OTP message, and the SIM indicator associated with the MSISDN, wherein the OTP delivery request is associated with the same 2FA registration with the service provider; determine, based on the OTP delivery request, a current IMSI associated with the MSISDN destined to receive the OTP message; obtain, from the updated datastore, based on the SIM indicator in the OTP delivery request, the second IMSI; and deliver, based on a match between the current IMSI associated with the MSISDN destined to receive the OTP message and the second IMSI obtained from the updated datastore, the OTP message to a user device associated with the MSISDN.

In yet another embodiment, a communications system to provide datastore management for SIM swap fraud prevention that utilizes a subscriber identity module (SIM) card at a user device as a security key is provided. The system comprises a datastore to store a SIM indicator in association with a first international mobile subscriber identity (IMSI) recorded for a mobile station international subscriber directory number (MSISDN) registered for 2FA with a service provider, wherein the first IMSI is associated with a first SIM card; and a first network node comprising at least one processor; at least one non-transitory memory; and a SIM management application comprising instructions stored at the at least one non-transitory memory, which when executed by the at least one processor, causes the SIM management application to receive, from a second network node, a first risk score for a first SIM change associated with the MSISDN, wherein the first SIM change is associated with a second IMSI of a second SIM card different than the first SIM card; update, based on the first risk score associated with the first SIM change satisfying a first criterion, the datastore to associate the SIM indicator with the second IMSI after an expiry of a first predetermined amount of time; receive, from the second network node, a second risk score for a second SIM change associated with the MSISDN, wherein the second SIM change is associated with a third IMSI of a third SIM card different than the first SIM card; update, based on the second risk score associated with the second SIM change satisfying a second criterion but failing to satisfy the first criterion, the datastore to associate the SIM indicator with the third IMSI after an expiry of a second predetermined amount of time greater than the first predetermined amount of time.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, where like reference numerals represent like parts.

FIG. 5 is a flow chart of a method according to an embodiment of the disclosure.

FIG. 7 is a flow chart of yet another method according to an embodiment of the disclosure.

DETAILED DESCRIPTION

Figure 1:
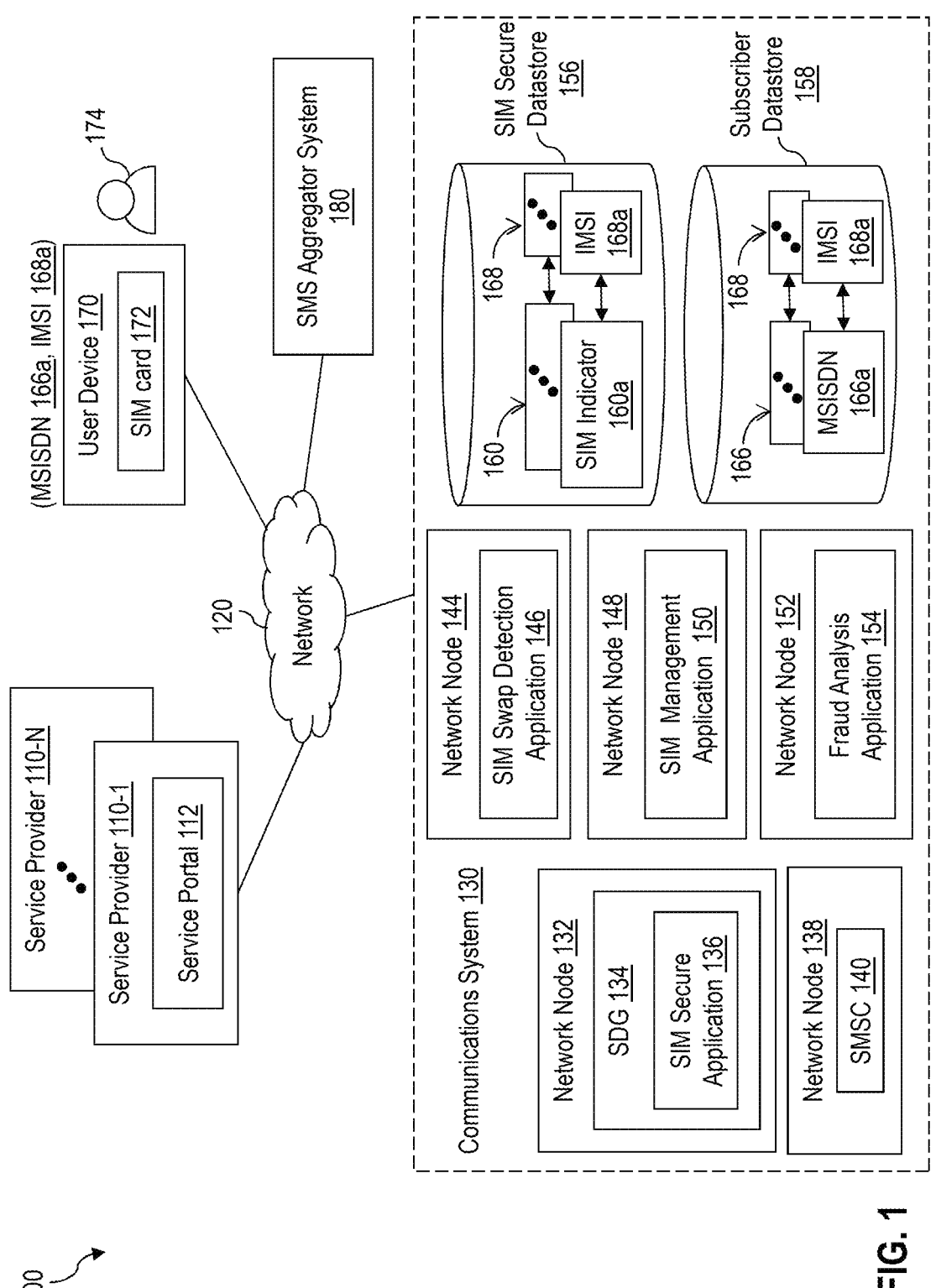
FIG. 1 is a block diagram of a network system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A mobile network operator or a mobile carrier is a mobile telecommunications company that provides wireless communication services (e.g., calls, text messaging, Internet access, etc.) for mobile device users. The mobile network operator may provide a subscriber identity module (SIM) card to a subscriber, and the subscriber may insert the SIM card into the subscriber's mobile device (e.g., a cell phone, a mobile phone, a smartphone, or any wirelessly equipped communication devices) to gain access to the wireless communication services. The subscriber's mobile device may generally be referred to as a user device. A mobile station international subscriber directory number (MSISDN) (e.g., a phone number) is assigned to the subscriber's mobile device to uniquely identify a subscription of the subscriber's mobile device in the network. An international mobile subscriber identity (IMSI) is assigned to the SIM card in the subscriber's mobile device to uniquely identify the subscriber in the network. The IMSI is stored on the SIM card of the subscriber's mobile device. The MSISDN is a public identity that may be used by others to place a call or send a text message to the subscriber's mobile device. On the other hand, the IMSI is a private identity that may be used by the mobile network operator to route calls and text messages to the subscriber's mobile device. In an example, an IMSI may include a mobile country code (MCC), a mobile network code (MNC), and a mobile subscription identification number (MSIN). The MSISDN is linked to the IMSI. The mobile network operator may utilize both the MSISDN and the corresponding IMSI when routing calls and/or messages to the subscriber's mobile device. For instance, the mobile network operator may maintain associations between MSISDNs and respective IMSIs. When the mobile network operator receives a call or a text message for a certain MSISDN, the mobile network operator may route the call or the text message according to a latest IMSI that is mapped to or associated with that MSISDN.

A SIM swap scam is a type of account takeover fraud that generally targets a weakness in two-factor authentication (2FA) and two-step verification in which the second factor or step is a text message or a call placed to a mobile phone. The fraud exploits a mobile network operator's ability to seamlessly port a subscriber's phone number (e.g., an MSISDN) to a device having a different SIM. This mobile number portability feature is normally used when a phone is lost or stolen, or a customer is switching service to a new phone.

The scam may begin with a fraudster gathering personal details about a targeted victim, for example, by using phishing emails, purchasing the personal details from organized criminals, or obtaining the personal details via social engineering. Armed with these personal details, the fraudster may contact the victim's mobile network operator. The fraudster may use social engineering techniques to convince the mobile network operator to port the victim's phone number to the fraudster's SIM. For instance, the fraudster may impersonate the victim using personal details to appear authentic and claiming that the victim's phone is lost. As part of porting the victim's phone number to the fraudster's SIM, the mobile network operator may update the association of the victim's phone number from the IMSI of the original SIM in the victim's phone to the IMSI of the fraudster's SIM.

Once the porting happens, the victim's phone may lose connection to the network, and the fraudster may receive all text messages and voice calls intended for the victim. This allows the fraudster to intercept one-time passwords (OTPs) sent to the victim and thus allows the fraudster to circumvent 2FA of victim's accounts (e.g., bank accounts, social media accounts, or any online accounts) that rely on text messages or telephone calls. For instance, the victim may initially register the victim's phone number for 2FA with business and/or institutions (e.g., a banking institution, a credit card company, a social media site, or any online service sites) for account access. Since the institutions have no knowledge of the fraudulent SIM swap, the institution may send OTPs to the victim's phone number, where the victim's phone number is in effect hijacked by the fraudster. As such, the fraudster may receive the OTPs intended for the victim. The fraudster may then use the OTPs to complete 2FAs to access the victim's accounts. After having access to the victim's accounts, the fraudster may directly transfer funds from a bank account of the victim, extort the rightful owner (the victim), or sell accounts of the victim on a black market for identity theft.

One way to mitigate a SIM swap fraud is for the mobile network operator to block delivery of OTP to a subscriber's MSISDN for a period of time (e.g., 1 hour to 48 hours) whenever a suspicious SIM card change (or a potential SIM swap scam) is detected for the subscriber's MSISDN. The reason for blocking the delivery for a period of time is that a fraudster may typically attempt to access a victim's account within a short time (e.g., about 5 minutes to about 1 hour) after hijacking the victim's phone number. However, this approach may be undesirable as there is no remedial action that the subscriber may take to use the subscriber's phone number for 2FA after a fraudulent SIM swap until the block is removed.

The present disclosure provides a technical solution to the aforementioned technical problems in the technical field of SIM swap fraud prevention to provide more secure and effective techniques using a SIM card in a user's mobile device as a security key for SIM swap prevention. For instance, the present disclosure provides a SIM secure framework to enhance 2FA by: (1) tracking the SIM card associated with a mobile phone number at the time when the mobile phone number registers for 2FA with a service provider (e.g., a banking institution, a credit card company, a social media site, or any online service provider); and (2) checking that the mobile phone number is associated with the same SIM card as during the registration before a subsequent OTP is delivered to the mobile phone number for 2FA. That is, instead of relying solely on a mobile phone number for 2FA, the SIM secure framework utilizes a combination of a mobile phone number (e.g., an MSISDN) and a corresponding SIM identifier (that identifies the SIM card associated with the mobile phone number) for 2FA. Further, after a fraudster hijacked the user's mobile phone number, the SIM secure framework allows the user to reinstate the user's mobile phone number to the user's SIM card and re-register for 2FA with the service provider instead of being blocked from using 2FA for a certain period.

To utilize a combination of a mobile phone number and a SIM identifier for 2FA, the mobile network operator and the service provider may have to track the SIM identifier. As discussed above, an IMSI is a unique number assigned to a SIM card and stored on the SIM card. Thus, it may be useful to use the IMSI as the SIM identifier for tracking whether there is a change to the SIM card associated with the mobile phone number. However, the IMSI is a private identity (e.g., known to the mobile network operator), and thus may not be suitable for sharing with other entities such as the service provider. As such, instead of providing the IMSI directly to the service provider, the SIM secure framework may provide the service provider with a mapped SIM identifier value (referred to as a SIM indicator, hereinafter) for such tracking purposes.

As used herein, the term "SIM indicator" is an opaque value or a mapped value that is mapped to the IMSI of a SIM card in a user's mobile device. The SIM indicator can be any numerical values (e.g., in decimal format, hexadecimal format, binary format, etc.) or alphanumerical values. An opaque value is a value that reveals no details other than the value itself. The reason that the SIM indicator is an opaque value is that a party external to a home service provider (e.g., a mobile network operator) cannot infer any details such as the IMSI of the SIM card from it. To support the use of a SIM card in a user's mobile device as a security key for SIM swap fraud prevention, the SIM indicator is assigned by the mobile network operator and provided to a service provider for performing 2FA (e.g., for user account access). The association between an IMSI and a corresponding SIM indicator is maintained by the mobile network operator.

In the SIM secure framework, when a user enrolls the user's mobile phone number (e.g., MSISDN) for 2FA with a service provider, the service provider additionally enrolls a SIM indicator associated with the user for 2FA. For example, when a user registers the user's MSISDN for 2FA with a service provider, the service provider may request for the user's SIM indicator from the mobile network operator. Upon receiving the user's SIM indicator, the service provider may register the user's MSISDN and the user's SIM indicator for subsequent 2FA purposes. When the user subsequently accesses an account or a service from the service provider, the user may receive a prompt for 2FA, requesting an entry of an OTP sent to the user's registered MSISDN. To send the OTP to the user's registered MSISDN, the service provider may send an OTP delivery request to the mobile network operator. The OTP delivery request may include not only the OTP message and the registered user's MSISDN, but also the registered user's SIM indicator.

The SIM secure framework introduces a go or no-go decision point in this subsequent OTP delivery process in which the mobile network operator may determine whether to proceed with delivery of the OTP to the user's MSISDN as requested by the service provider or to block the delivery of the OTP. For instance, the mobile network operator may perform a check to ensure that the user's device is associated with the correct SIM identifier (e.g., IMSI) prior to sending the OTP to the user's MSISDN. To that end, the mobile network operator may use the received SIM indicator to retrieve an IMSI of record (at the time when the user registers the user's MSISDN for 2FA with the service provider) for comparison with an IMSI associated with the user's MSISDN at the time when the OTP delivery request is received. As discussed above, the mobile network operator may maintain associations between MSISDNs and respective IMSIs (which may be referred to as MSISDN-IMSI associations) and associations between SIM indicators and respective IMSIs (which may be referred to as SIM indicator-IMSI associations). Thus, the mobile network operator may obtain the IMSI associated with the user's MSISDN at the time when the OTP delivery request is received by looking up the MSISDN-IMSI associations based on the received user's MSISDN. The mobile network operator may also obtain the IMSI recorded at the time when the user registers for 2FA with the service provider by looking up the SIM indicator-IMSI associations based on the received SIM indicator. The mobile network operator may check if the IMSI associated with the received MSISDN matches the IMSI recorded for the received SIM indicator. If there is a match, the mobile network operator may send the OTP to the user's MSISDN. Otherwise, the mobile network operator may block the sending of the OTP to the user's MSISDN. In other words, the mobile network operator may send the OTP to the user's MSISDN provided the SIM identifier (the IMSI) associated with the MSISDN has not changed since the initial registration.

Under the SIM secure framework, if a malicious actor gains access to a user's phone number (e.g., MSISDN) through a SIM swap fraud (where the user's phone number is associated with a new SIM of the malicious actor), the malicious actor will be unable to perpetrate identity fraud. This is because the OTP sent by the service provider to the combination of phone number and SIM indicator will not be delivered to the new SIM (of the malicious actor). After the SIM swap fraud occurs, the user may reinstate the user's phone number to the user's SIM card. For instance, the user may request the mobile network operator to re-establish an association between the user's MSISDN and the user's IMSI. After the reinstatement, the user may regain access to services using the OTP sent to the combination of the user's phone number and SIM indicator.

According to an embodiment of the present disclosure, in the SIM secure framework, a SIM secure application may be implemented on a computer system (e.g., a service delivery gateway (SDG)) of a communications system (e.g., a mobile network operator system or a telecommunications carrier system) to provide SIM swap fraud prevention using a SIM card in a user device as a security key. The computer system may include processor(s) and non-transitory memory, where the SIM secure application may include instructions stored at the non-transitory memory and executable by the processor(s).

For example, the SIM secure application may receive an initial OTP delivery request (e.g., a first OTP delivery request) from a service provider (e.g., a banking institution, a credit card company, a social media site, or any online service providers). The initial OTP delivery request may include an initial OTP message and an MSISDN destined to receive the initial OTP message. To facilitate the use of a SIM card as a security key for SIM swap fraud prevention, the initial OTP delivery request may further include a request for a SIM indicator associated with the MSISDN. The initial OTP delivery request may be triggered by a user registering the MSISDN (of a user device) for 2FA with the service provider. The registering may be part of an initial registration or a re-registration (e.g., for an account update) with the service provider. After receiving the initial OTP delivery request, the SIM secure application may deliver the initial OTP message to the user device associated with the destined MSISDN. As part of delivering the initial OTP message to the destined MSISDN, the SIM secure application may transmit, to a short message service center (SMSC) of the communications system, a request to deliver the initial OTP message to the destined MSISDN. In response, the SIM secure application may receive, from the SMSC, an indication of a successful delivery of the initial OTP message.

The communications system may include a subscriber datastore including MSISDNs, each identifying a subscription of a respective user device and in association with an IMSI of a SIM card in the respective user device. To facilitate the use of a SIM card as a security key for SIM swap fraud prevention, the communications system may further include a SIM secure datastore including SIM indicators, each in association with an IMSI of record for a respective MSISDN (e.g., at the time when the MSISDN is registered for 2FA). Thus, the SIM secure application may obtain, from the subscriber datastore, an IMSI associated with the received MSISDN (destined to receive the initial OTP message). The SIM secure application may further obtain, from the SIM secure datastore, a SIM indicator for the IMSI associated with the received MSISDN. The SIM secure application may transmit, to the service provider, a delivery report including the SIM indicator associated with the MSISDN (destined to receive the initial OTP message) and the indication of the successful delivery of the initial OTP message.

The service provider may register and store the MSISDN in association with the SIM indicator received from the delivery report for subsequent 2FA(s) associated with the MSISDN. For example, the SIM secure application may receive a subsequent OTP delivery request (e.g., a second OTP delivery request) from the service provider. The subsequent OTP delivery request may include a subsequent OTP message, the MSISDN destined to receive the subsequent OTP message, and the SIM indicator (registered in association with the MSISDN for 2FA). The SIM secure application may obtain, from the subscriber datastore, a current IMSI associated with the received MSISDN destined to receive the subsequent OTP message. The current IMSI corresponds to a latest IMSI mapped to the MSISDN at the time when the subsequent OTP delivery request is received. The SIM secure application may also obtain, from the SIM secure datastore, an IMSI of record associated with the received SIM indicator. In some examples, the SIM secure application may query the SIM secure datastore for an IMSI associated with the received SIM indicator and may receive the IMSI of record in response to the query. In some examples, the SIM secure application may index into the SIM secure datastore using the SIM indicator to obtain the IMSI of record.

After obtaining the IMSI of record, the SIM secure application may determine whether the current IMSI associated with the received MSISDN destined to receive the subsequent OTP message matches the IMSI of record (obtained from the SIM secure datastore). If there is a match between the current IMSI associated with the MSISDN destined to receive the subsequent OTP message and the IMSI of record (obtained from the SIM secure datastore), the SIM secure application may determine that there is no SIM card change associated with the MSISDN. Accordingly, the SIM secure application may deliver the subsequent OTP message to the user device associated with the MSISDN. As part of delivering the subsequent OTP message to the user device associated with the MSISDN, the SIM secure application may transmit, to the SMSC, a request to deliver the subsequent OTP message to the user device associated with the MSISDN. In response, the SIM secure application may receive, from the SMSC, an indication of a successful delivery of the subsequent OTP message. The SIM secure application may transmit, to the service provider, a delivery report including the indication of the successful delivery of the subsequent OTP message.

If, however, there is a mismatch between the current IMSI associated with the MSISDN destined to receive the subsequent OTP message and the IMSI of record (obtained from the SIM secure datastore), the SIM secure application may determine that there is a SIM card change (e.g., a fraudulent SIM swap) associated with the MSISDN. Accordingly, the SIM secure application may block delivery of the subsequent OTP message to the destined MSISDN and may transmit, to the service provider, an indication of a failure to deliver the subsequent OTP message to the destined MSISDN.

To get around the delivery block in the event of a legitimate SIM swap, the user or subscriber may re-register the MSISDN with the service provider for 2FA. For instance, after the legitimate SIM swap, the subscriber datastore may have an updated association between the user's MSISDN and a new IMSI. The re-registration may trigger the service provider to send an initial OTP request as discussed above in which a new SIM indicator may be assigned to the user based on the new IMSI. The re-registration process may resemble registering a new hardware security key for 2FA when the user misplaces or loses the user's original security key.

In some examples, it may be desirable to provide more seamless and uninterrupted services to the user in the event of a legitimate SIM swap. According to a further embodiment, the communications system may evaluate the risk associated with a detected SIM change and may update the subscriber datastore and/or the SIM secure datastore based on the evaluated risk. For instance, the communications system may include a first network node (e.g., a computer system) implementing a SIM management application, a second network node (e.g., a computer system) implementing a SIM change detection application, and a third network node implementing a fraud analysis application. The SIM management application may receive, from the second network node (or more specifically the SIM change detection application), an indication of a detected SIM change at the user device (e.g., a detection of a request to associate a new SIM with the user's MSISDN). The SIM management application may transmit, to the third network node (or more specifically the fraud analysis application), an analysis request for the detected SIM change. In response to the analysis request, the SIM management application may receive, from the third network node, a risk score (or a level of risk) associated with the detected SIM change. The level of risk, or risk score, may be a numerical value, e.g., 1 to 10, or may be a non-numerical label, such as "low," "moderate," or "high" risk. Other numerical ranges, labels, or number of labels can be used to indicate the level of risk associated with the SIM change.

The SIM management application may update the subscriber datastore and/or SIM secure datastore or block update of the subscriber datastore and/or SIM secure datastore according to the level of risk associated with the detected SIM change. For example, the SIM management application may receive a risk score for a SIM change to associate the MSISDN with a new IMSI. If the risk score associated with the SIM change satisfies a first criterion (e.g., corresponding to a low-risk SIM swap such as a legitimate SIM swap), the SIM management application may update the subscriber datastore to associate the MSISDN with the new IMSI and update the SIM secure datastore to associate the SIM indicator with the new IMSI. In other words, when the SIM swap has a low risk, the SIM indicator-IMSI association for the SIM indicator may be updated automatically.

If the risk score satisfies a second criterion but fails to satisfy the first criterion (e.g., corresponding to a moderate-risk SIM swap), the SIM management application may update the subscriber datastore to associate the MSISDN with the new IMSI, and after an expiry of a predetermined amount of time, update the SIM secure datastore to associate the SIM indicator with the new IMSI. In other words, when the SIM swap has a moderate risk, the SIM indicator-IMSI association for the SIM indicator may be updated after a delay. In an embodiment, the predetermined amount of time is determined based on the risk score (e.g., a numerical value), where the predetermined amount of time may be longer for a higher risk. As an example, a risk score for a SIM change may vary between 1 and 10, where a higher score corresponds to a higher risk. If the risk score is between 3-4, the predetermined amount of time may be about 24 hours. If the risk score is between 5-6, the predetermined amount of time may be about 48 hours. If the risk score is between 7-8, the predetermined amount of time may be about 96 hours.

If the risk score fails to satisfy the first criterion and the second criterion (e.g., corresponding to a moderate-risk SIM swap), the SIM management application may block updating SIM secure datastore and the subscriber datastore with the new IMSI.

In the case where the subscriber datastore is updated to associate the MSISDN with the new IMSI and the SIM secure datastore is updated to associate the SIM indicator with the new IMSI after the SIM change, the user may continue to use the MSISDN for 2FA with the service provider without re-registering the MSISDN for 2FA with the service provider.

Using a SIM indicator (a mapped IMSI value that is not private) allows a mobile network operator to share the SIM indicator with a service provider and allows the service provider to register an MSISDN and a corresponding SIM indicator for 2FA. That is, 2FA no longer relies fully on an MSISDN but the corresponding SIM card as well, and thus may prevent a SIM swap fraud. Recording an IMSI associated with an MSISDN (via a SIM indicator-IMSI association) at the time when the MSISDN is registered for 2FA with a service provider and checking that the IMSI has not changed before an OTP message is delivered to the MSISDN can ensure that a fraudster cannot intercept OTP(s) intended for a victim after hijacking the victim's MSISDN. Further, the recording and tracking enables a mobile network operator to provide more seamless and uninterrupted services to a user than simply blocking OTP delivery to the user's phone number after a SIM swap fraud. For instance, the recording and tracking can enable a user to reinstate the user's phone number (MSISDN) to the user's SIM card and re-register for 2FA with the service provider after a SIM swap fraud.

While the present disclosure is discussed in the context of utilizing a SIM card as a security key for SIM swap prevention, the disclosed techniques may also be applicable for embedded-SIMs (eSIMs). Further, the term "MSISDN" may generally be referred to as a phone number, the term "IMSI" may generally be referred to as a SIM identifier that is assigned to a SIM module (e.g., a physical SIM card or an eSIM) in a subscriber device by a mobile service network, and the term "OTP" may generally be referred to as a password. In other words, while the operations discussed herein utilize the terms "MSISDN," "IMSI," and "OTP," those terms can be respectively replaced by "phone number," "SIM identifier," and "password."

Turning now to FIG. 1, a network system 100 is described. The network system 100 includes N number of service providers 110 (individually shown as 110-1 to 110 N, where N may be any suitable integer value), a network 120, a communications system 130, a user device 170 (e.g., of a user 174), and a short message service (SMS) aggregator system 180.

The network 120 promotes communication between the components of the network system 100. The network 120 may be any communication network including a public data network (PDN), a public switched telephone network (PSTN), a private network, and/or a combination. The communications system 130 may provide wireless communication services (e.g., phone calls, text messages, Internet services, etc.) to subscribers or users (e.g., the user 174). In some examples, the communications system 130 may be a mobile network operator system or a telecommunications carrier system.

The user device 170 may be a cell phone, a mobile phone, a smart phone, a personal digital assistant (PDA), an Internet of things (IoT) device, a wearable computer, a headset computer, a laptop computer, a tablet computer, a notebook computer, embedded wireless modules, and/or other wirelessly equipped communication devices (whether or not user operated). The user device 170 may include a SIM card 172. In an example, the SIM card 172 may store data, such as a unique serial number associated with the SIM card 172, an IMSI, security authentication data, contact data, capability data, and/or service data associated with communications in the communications system 130. In an example, the SIM card 172 may be an integrated circuit that can be inserted and removed from the user device 170.

In an example, the user device 170 may be assigned with a phone number (e.g., an MSISDN 166a) and the SIM card 172 may be assigned with a SIM card identifier (e.g., an IMSI 168a stored on the SIM card 172) for communications in the communications system 130. The phone number or the MSISDN 166a may identify a subscription of the user device 170 in the communications system 130 and may be used by others to place a call or send a text message to the user device 170. The MSISDN 166a of the user device 170 may be linked to the IMSI 168a of the SIM card 172 (at the user device 170). For instance, an individual or an entity may place a call or send a message to the user 174 using the MSISDN 166a of the user device 170. The communications system 130 may route the call or the message to the user device 170 based on a latest mapping of that MSISDN 166a to the IMSI 168a of the user device 170.

The service providers 110 may provide services to the user 174 via the user device 170. The service providers 110 may include, but are not limited to, banking institutions, credit card companies, social media sites, and/or entities that provide online services. In some examples, each service provider 110 may provide a service portal 112 (e.g., a web site) for the user 174 to interact with the service provider 110, for example, via a user account. Generally, each service provider 110 may provide services and interact with multiple users (e.g., 10s, 100s, 1000s or more). In some examples, the user 174 may login to a service portal 112 of a service provider 110 (e.g., the service provider 110-1) using the user's credentials (e.g., login name and password). The service provider 110 may further utilize 2FA to provide more secure account access, where the 2FA may include an OTP in a text message or a call placed to the user device 170. To support utilizing a SIM card 172 as a security key for SIM swap fraud prevention, when the user 174 enrolls or registers the user's MSISDN 166a (the MSISDN 166a of the user device 170) for 2FA with the service provider 110, the service provider 110 may additionally enroll a SIM indicator associated with the user's SIM card 172 in the user device 170 for 2FA as will be discussed more fully below with reference to FIGS. 2A-2B.

The SMS aggregator system 180 may be a computer system including processor(s) and non-transitory memory. The SMS aggregator system 180 may be configured to implement various functions and/or applications having instructions stored at the non-transitory memory of the computer system and executable by the processor(s) of the computer system. For example, the SMS aggregator system 180 may be configured to collect or aggregate a large volume of text messages from different brands and/or businesses (e.g., the service providers 110) and distribute those messages to mobile carriers (e.g., the communications system 130) for delivery to respective user devices (e.g., the user device 170). In an example, a service provider 110 may send a text message (e.g., including an OTP) destined to a user device 170 via the SMS aggregator system 180, and the SMS aggregator system 180 may forward the text message to the communications system 130 for delivery to the user device 170.

As further shown in FIG. 1, the communications system 130 may include various network nodes shown as 132, 138, 144, 148, and 152, a SIM secure datastore 156, and a subscriber datastore 158. The subscriber datastore 158 may be stored in a storage device (e.g., including non-transitory memory) of the communication system 130. The subscriber datastore 158 may store information associated with subscribers. In particular, the subscriber datastore 158 may store associations between MSISDNs 166 and respective IMSIs 168. For instance, the subscriber datastore 158 may include a plurality of MSISDN-IMSI associations (e.g., 5, 10, 100, 1000 or more), each including an MSISDN 166 that identifies a user device (e.g., the user device 170) and a respective IMSI 168 associated with a SIM card (e.g., the SIM card 172) in the user device 170 and stored on the SIM card. As shown in FIG. 1, the subscriber datastore 158 includes an association between the user 174's MSISDN 166a and the user 174's IMSI 168a. In an example, the subscriber datastore 158 may be accessed (e.g., read and/or write) via various mechanisms by one or more components of the communications system 130.

The SIM secure datastore 156 may be stored in a storage device (e.g., including non-transitory memory) of the communications system 130. The SIM secure datastore 156 may store information associated with using a SIM card (e.g., the SIM card 172) as a security key for SIM swap fraud prevention. In particular, the SIM secure datastore 156 may store a plurality of SIM indicator-IMSI associations (e.g., 5, 10, 100, 1000 or more), each including a SIM indicator 160 and respective IMSI 168. The SIM indicators 160 are created by the communications system 130 to support using SIM cards (e.g., the SIM card 172) as security keys for SIM swap fraud prevention. Each SIM indicator 160 is tied to or associated with a SIM card 172, where a corresponding IMSI 168 is associated with the respective SIM card 172. Stated differently, each SIM indicator 160 is created for tracking a corresponding IMSI 168. As shown in FIG. 1, the SIM secure datastore 156 includes an association between the user 174's MSISDN 166a and a SIM indicator 160a created for the user 174 for tracking the IMSI 168a of the user 174. In an example, the SIM secure datastore 156 may be accessed (e.g., read and/or write) by one or more components of the communications system 130. While FIG. 1 illustrates two separate datastores for storing the MSISDN-IMSI associations and the SIM indicator-IMSI associations, the MSISDN-IMSI associations and the SIM indicator-IMSI associations can be stored and organized in any suitable datastore configurations.

Each of the network nodes 132, 138, 144, 148, and 152 may be a computer system including processor(s) and non-transitory memory. For example, the network node 132 may include a service delivery gateway (SDG) 134 configured to implement various functions and/or applications having instructions stored at the non-transitory memory of the respective computer system and executable by the processor(s) of the respective computer system. In an example, the SDG 134 may be configured to receive messages, e.g., via the network 120. In an example, the SDG 134 may be configured to receive application-to-person (A2P) messages, which are generally sent from an application (e.g., the service portal 112) associated with a business (e.g., the service providers 110). For example, OTPs associated with 2FA systems are often sent using A2P messaging. The SDG 134 may implement a SIM secure application 136. The SIM secure application 136 may perform operations to support utilizing a SIM card 172 as a security key for SIM swap fraud prevention. For instance, the operations may include: (1) tracking the SIM card 172 associated with the MSISDN 166a of the user device 170 (via the SIM indicator 160a) at the time when the user 170 registers the MSISDN for 2FA with a service provider 110; and (2) checking that the MSISDN 166a is associated with the same SIM card 172 before a subsequent OTP is delivered to the MSISDN 166a for 2FA as will be discussed more fully below with reference to FIGS. 2A-2B and FIGS. 3A-3B.

The network node 138 may include an SMSC 140 implementing various functions and/or applications having instructions stored at the non-transitory memory of the respective computer system and executable by th e processor(s) of the respective computer system. In an example, the SMSC 140 may be configured to perform various messaging operations, such as forwarding, storing, and delivering text messages. In an example, the SMSC 140 may be configured to interact with the SDG 134 to deliver A2P messages that are associated with 2FA to the user device 170.

The network node 144 may include a SIM swap detection application 146 having instructions stored at the non-transitory memory of the respective computer system and executable by the processor(s) of the respective computer system. The network node 148 may include a SIM management application 150 having instructions stored at the non-transitory memory of the respective computer system and executable by the processor(s) of the respective computer system. The network node 152 may include a fraud analysis application 154 having instructions stored at the non-transitory memory of the respective computer system and executable by the processor(s) of the respective computer system. In some examples, the network node 144, the network node 148, and network node 152 may be referred to as an access node, a service node, and a fraud analysis node, respectively.

The SIM swap detection application 146 may detect a SIM card change in a user device (e.g., the user device 170). For instance, when the user 174 replaces the original SIM card 172 with a new SIM card in the user device 170 or when the user 174 upgrades the user device 170, the user 174 may call an operator of the communications system 130 to notify the operator of the SIM card change and provide a new IMSI 168 of the new SIM card 172 to the operator. Similarly, in the case of a SIM swap fraud, a malicious actor may call an operator of the communications system 130 to notify the operator of a SIM card change associated with the user's MSISDN 166a and provide an IMSI 168 of the malicious actor to the operator. The call or notification from the user 174 or the malicious actor may trigger a SIM card change detection at the SIM swap detection application 146. Upon receiving the SIM card change detection, the SIM swap detection application 146 may transmit an indication of the detected SIM card change to the SIM management application 150. The SIM management application 150 may request the fraud analysis application 154 to evaluate a level of risk associated with the detected SIM card change. The fraud analysis application 154 may perform risk analysis for the detected SIM card change and provide an indication of the level of risk (e.g., a risk score) associated with the detected SIM card change to the SIM management application 150. The SIM management application 150 may handle the detected SIM card change in various ways based on the risk score received from the fraud analysis application 154 as will be discussed more fully below with reference to FIGS. 4-6.

FIG. 1 is merely an example of components of a network system, and variations are contemplated to be within the scope of the present disclosure. In embodiments, the network system may include other components not illustrated in FIG. 1. In embodiments, the network system may not include every component illustrated in FIG. 1. In embodiments, the components and connections may be implemented with different connections than those illustrated in FIG. 1. Further, while FIG. 1 illustrates each of the SIM secure application 136, the SIM swap detection application 146, the SIM management application 150, and the fraud analysis application 154 implemented on a different network node, these applications can be implemented on any suitable network nodes (e.g., in a single network node or distributed over multiple network nodes) in the communications system 130. Such and other embodiments are contemplated to be within the scope of the present disclosure.

Figure 2A:
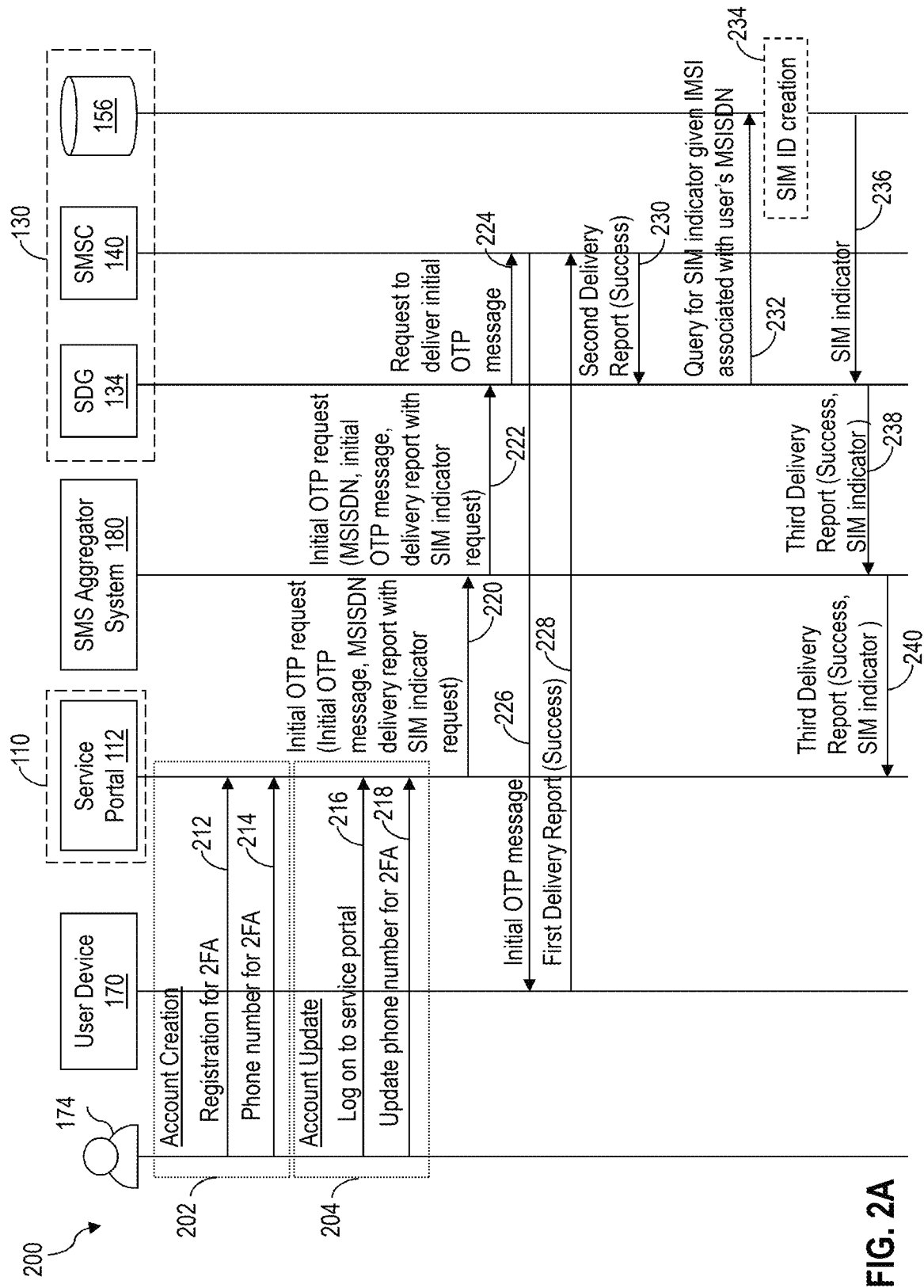
FIGS. 2A-2B are signaling diagrams illustrating an example two-factor authentication (2FA) registration method for utilizing a subscriber identity module (SIM) card as a security key for SIM swap fraud prevention according to an embodiment of the disclosure.
Figure 2B:
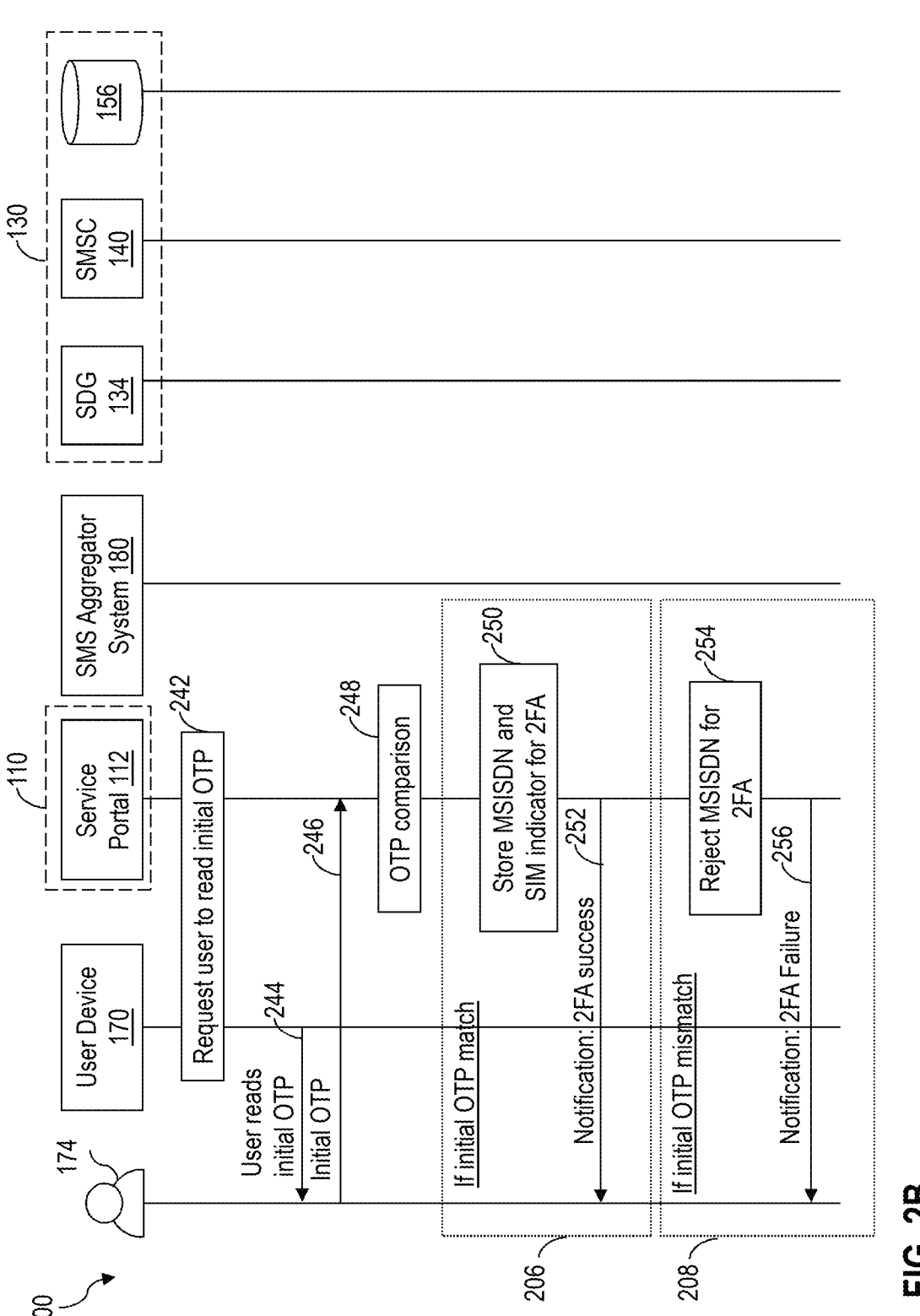
Figure 8:
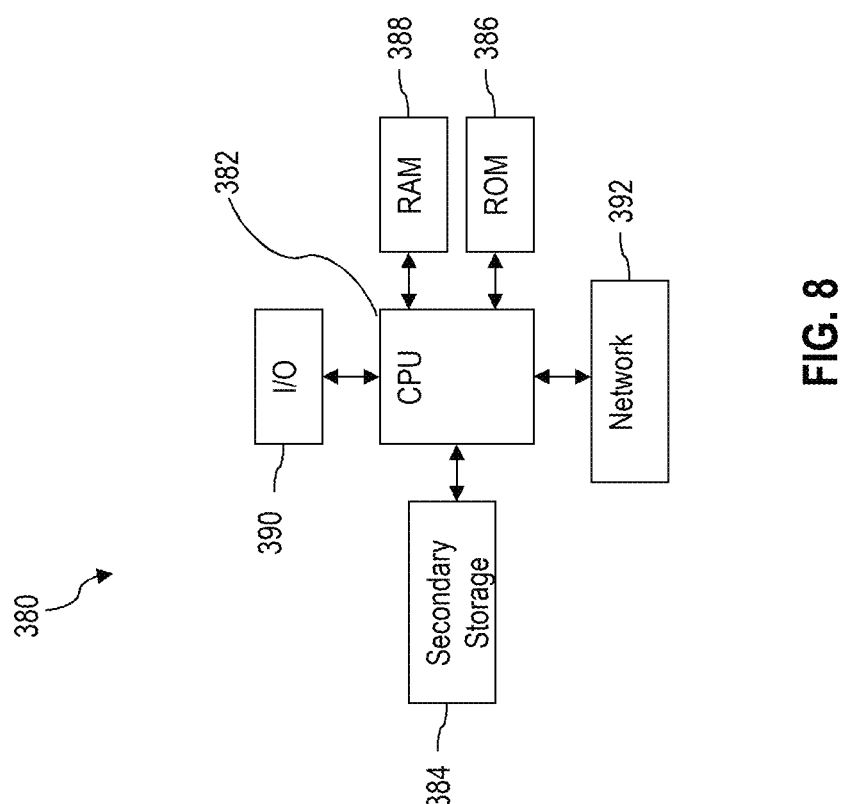
FIG. 8 is a block diagram of a computer system according to an embodiment of the disclosure.

Turning now to FIGS. 2A-2B, an example 2FA registration method 200 for utilizing a SIM card as a security key for SIM swap fraud prevention is described. The method 200 illustrates operations performed by various components of the network system 100. Specifically, the components include an SDG 134, an SMSC 140, and a SIM secure datastore 156 of a communications system 130, an SMS aggregator system 180, a service portal 112 of a service provider 110, a user 174, and a user device 170 of the user 174. However, it is contemplated that other component(s) of the network system 100 may be involved in performing the operations of the method 200. In embodiments, each of the SDG 134, the SMSC 140, the SIM secure datastore 156, the SMS aggregator system 180, the service portal 112, and the user device 170 may implement the operations of the method 200 using a computer system with components as shown in FIG. 8. As illustrated, FIGS. 2A-2B includes a number of enumerated operations, but embodiments of the operations in FIGS. 2A-2B may include additional operations before, after, and in between the enumerated operations. In some embodiments, one or more of the enumerated operations may be omitted or performed in a different order.

The method 200 illustrates two scenarios 202 and 204 in which the user 174 may register the user's phone number (e.g., MSISDN) for 2FA. In the scenario 202, the user 174 may create an account with the service provider 110, for example, to utilize a certain service (e.g., banking, purchasing, emails, etc.) of the service provider 110. For instance, at operation 212, the user 174 may transmit, via the user device 170, and the service portal 112 may receive, a registration request (e.g., to create an account with the service provider 110). In an example, as part of the account creation, the user 174 may create a username and a password for logging onto the service portal 112. At operation 214, the user 174 may transmit, via the user device 170, and the service portal 112 may receive, a phone number to be used for 2FA with the service provider 110.

In the scenario 204, the user 174 may have a new phone number (e.g., a new MSISDN 166) for the user device 170 and thus may register the new phone number with the service provider 110 for 2FA. For instance, at operation 216, the user 174 may login to the service portal 112, via the user device 170, using the user 174's credential (e.g., the username and the password). At operation 218, the user 174 may transmit, via the user device 170, and the service portal 112 may receive, a new phone number to be used for 2FA with the service provider 110.

The service provider 110 may utilize the same mechanisms to register the user 174's phone number for 2FA when the user 174 creates an account or when the user 174 updates the account. The following operations may refer to the user 174's phone number as MSISDN 166a, which may be the user 174's original phone number for the scenario 202 or the user 174's new phone number for the scenario 204. Further, the operations of the SDG 134 described below may be performed by the SIM secure application 136.

At operation 220, the service portal 112 may transmit, and the SMS aggregator system 180 may receive, an initial OTP delivery request (e.g., a first OTP delivery request). The initial OTP delivery request may include an initial OTP message, the user 174's MSISDN 166a destined to receive the initial OTP message, and a request for a delivery report and a SIM indicator associated with the MSISDN 166a. The service provider 110 may generate an initial OTP, which may be a series of numerical numbers (e.g., 22315) or a series of alphanumeric values (e.g., 22ABC), using any suitable algorithm (e.g., a random generation). The service provider 110 may generate the initial OTP message and include the initial OTP in the message. In an example, the initial OTP message may include "Your access code for company XYZ is 22315". In general, the initial OTP message can include any text indicating the initial OTP and the service provider 110 that provided the initial OTP.

At operation 222, upon the SMS aggregator system 180 receiving the initial OTP delivery request, the SMS aggregator system 180 may transmit, and the SDG 134 may receive, the initial OTP delivery request.

At operation 224, upon the SDG 134 receiving the initial OTP delivery request, the SDG 134 may transmit, and the SMSC 140 may receive, a request to deliver the initial OTP message to the MSISDN 166a. At operation 226, upon SMSC 140 receiving the request to deliver the initial OTP message to the MSISDN 166a, the SMSC 140 may transmit, and the user device 170 may receive, the initial OTP message. For instance, the SMSC 140 may obtain an IMSI 168a associated with the MSISDN 166a of the user device 170 (e.g., the IMSI stored at a SIM card 172 of the user device 170) from the subscriber datastore 158 and route the initial OTP message to the user device 170 according to the IMSI 168a. The delivery of the initial OTP message may be in the form of a text message including the initial OTP for the 2FA.

At operation 228, upon the user device 170 successfully receiving the initial OTP message, the user device 170 may transmit, and the SMSC 140 may receive, a first delivery report including an indication of a successful reception of the initial OTP message. At operation 230, upon the SMSC 140 receiving the first delivery report, the SMSC 140 may transmit, and the SDG 134 may receive, a second delivery report including an indication of a successful delivery of the initial OTP message.

After receiving the second delivery report, the SDG 134 may fetch a SIM indicator associated with the user 174. For instance, at operation 232, the SDG 134 may query the SIM secure datastore 156 for a SIM indicator 160 for the IMSI 168a associated with the MSISDN 166a (e.g., the IMSI

168a stored at a SIM card 172 of the user device 170). To that end, the SDG 134 may obtain the IMSI 168a associated with the MSISDN 166a of the user device 170 from the subscriber datastore 158 and use the obtained IMSI 168a to query the SIM secure datastore 156.

At operation 236, in response to the query, the SDG 134 may receive a SIM indicator 160a associated with the user 174's IMSI 168a from the SIM secure datastore 156. The SIM indicator 160 may be a mapped value of the IMSI 168a. In some examples, the SIM secure datastore 156 may not have a SIM indicator 160a mapped to the user 174's IMSI 168a. For instance, this may be a first time that the user 174 registers the user 174's MSISDN 166a for 2FA. In such examples, at operation 234, a SIM indicator 160a may be created for the user 174's MSISDN 166a. In some examples, the communications system 130 may have an application implemented on a network node to manage the SIM secure datastore 156 and the creation of the SIM indicator 160 may be performed by that network node. In an example, the SIM management application 150 may manage the SIM secure datastore 156.

At operation 238, upon the SDG 134 receiving the SIM indicator 160a, the SDG 134 may transmit, and the SMS aggregator system 180 may receive, a third delivery report including the indication of the successful delivery of the initial OTP message and the SIM indicator 160a.

At operation 240, upon the SMS aggregator system 180 receiving the third delivery report, the SMS aggregator system 180 may transmit, and the SDG 134 may receive, the third delivery report including the indication of the successful delivery of the initial OTP message and the SIM indicator 160a. Stated differently, on successful delivery of the initial OTP message, the service provider 110 may receive the SIM indicator 160a associated with the user 174's MSISDN 166a.

At operation 242, upon the service portal 112 receiving the third delivery report, the service portal 112 may request the user 174 to read the initial OTP (e.g., displaying a prompt to read the OTP for 2FA at the service portal 112). At operation 244, the user 174 may read the initial OTP from the user device 170 (e.g., in the text message received at the user device 170 at operation 226). At operation 246, the user 174 may transmit or submit, and the service portal 112 may receive, the initial OTP (received from the text message).

At operation 248, the service portal 112 may compare the initial OTP submitted by the user 174 (at operation 246) and the initial OTP created by the service portal 112. If there is a match, the operations in the dotted box 206 may be performed. For instance, at operation 250, the service portal 112 may store the user 174's MSISDN 166a and the SIM indicator 160a from the third delivery report received at operation 240 for performing subsequent 2FAs with the user 174. Stated differently, on successful OTP match, the service provider 110 may register or enroll the user 174's MSISDN 166a and the SIM indicator 160a for subsequent 2FAs. At operation 252, the service portal 112 may transmit, and the user 174 may receive (via the user device 170) a notification of a 2FA success (for the 2FA request at the scenario 202 or 204).

If, however, there is a mismatch between the initial OTP submitted by the user 174 at operation 246 and the initial OTP created by the service portal 112, the operations in the dotted box 208 may be performed. For instance, at operation 252, the service portal 112 may reject the MSISDN 166a for 2FA. At operation 256, the service portal 112 may transmit, and the user 174 may receive, via the user device 170, a notification of a 2FA failure. In some examples, upon receiving the 2FA failure notification, the user 174 may retry to register for 2FA with the service provider 110.

Figure 3A:
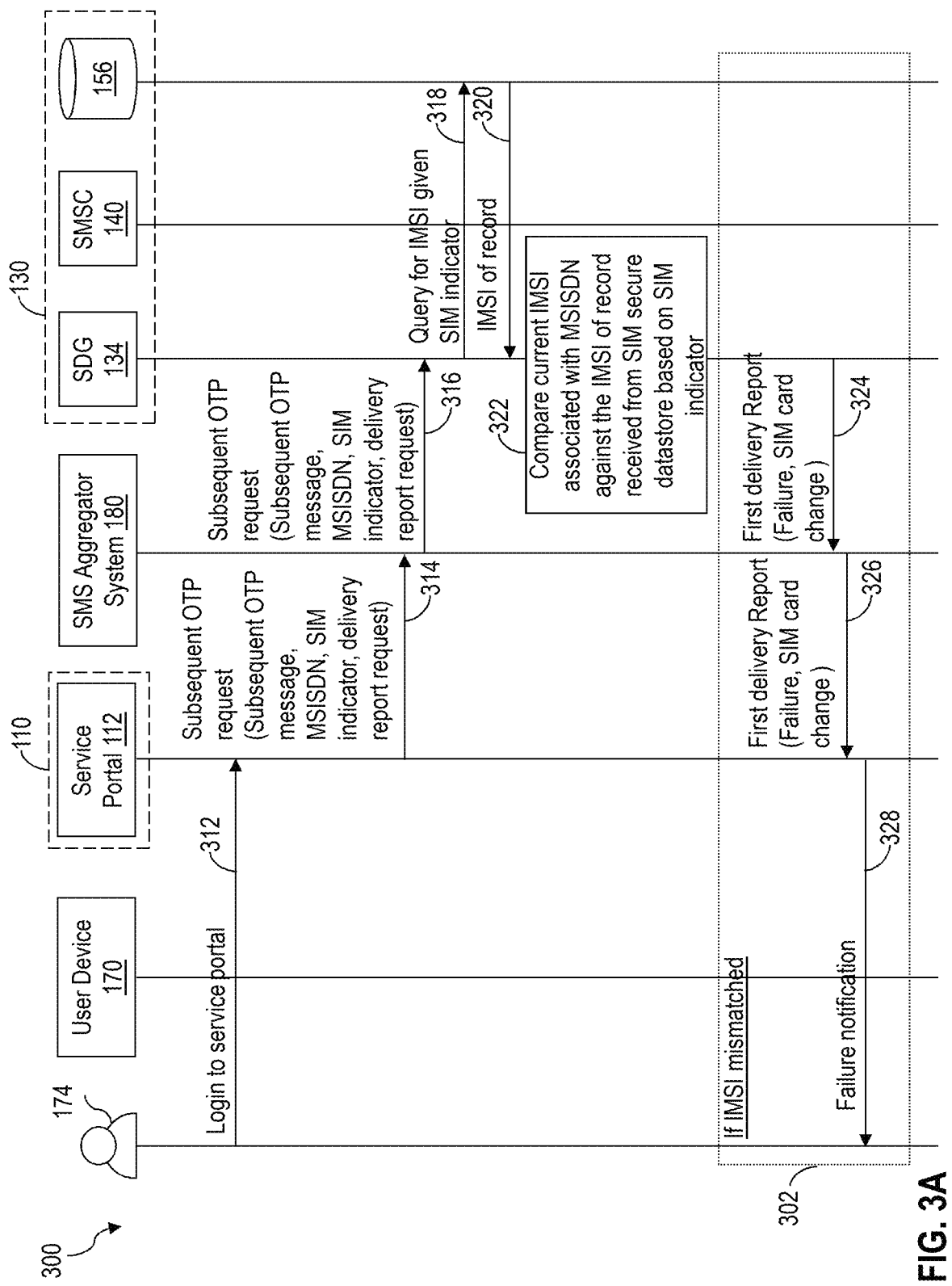
FIGS. 3A-3B are signaling diagrams illustrating an example enhanced 2FA method that utilizes a SIM card as a security key for SIM swap fraud prevention according to an embodiment of the disclosure.
Figure 3B:
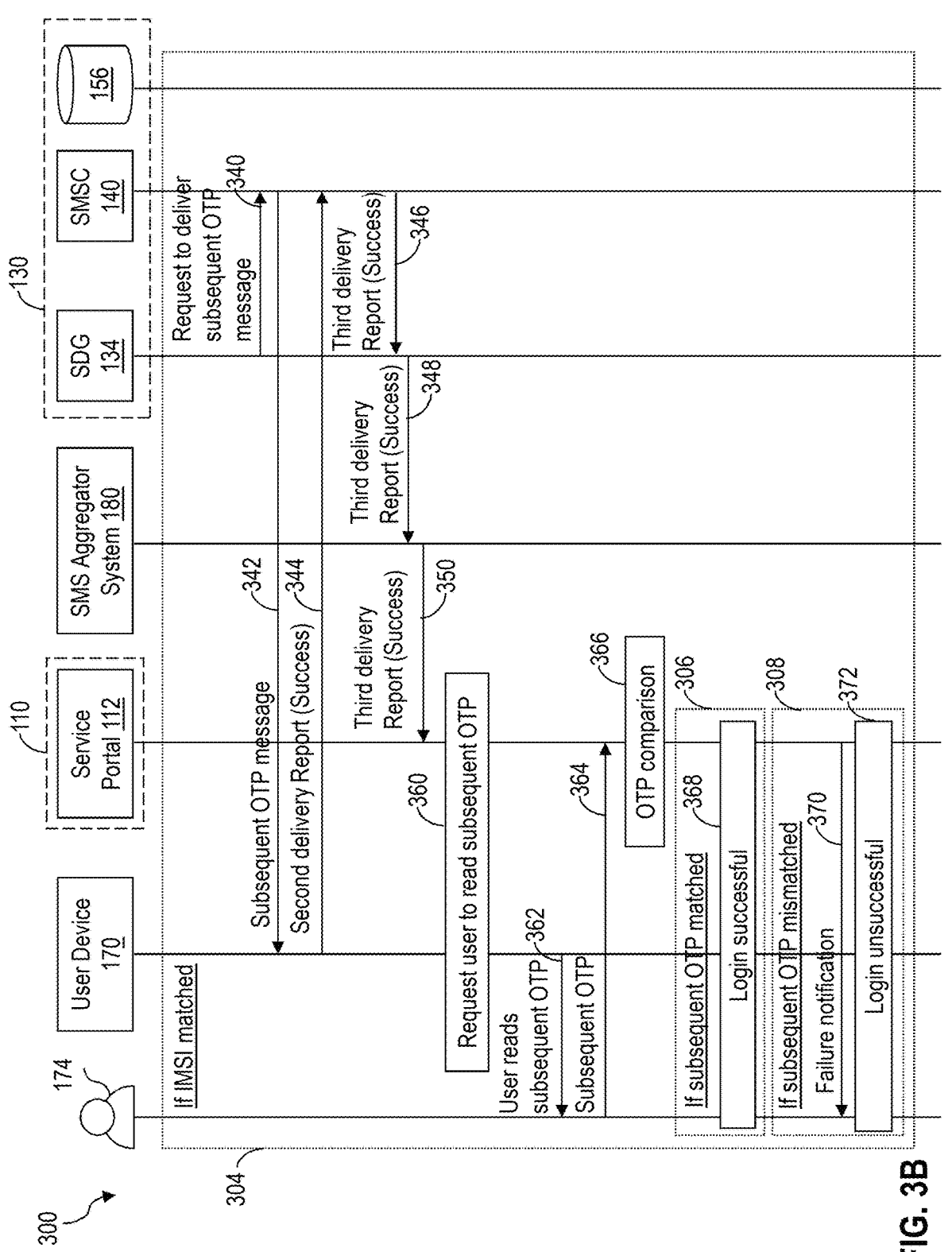

Turning now to FIGS. 3A-3B, an example enhanced 2FA method 300 that utilizes a SIM as a security key for SIM swap fraud prevention is described. The method 300 illustrates operations performed by various components of the network system 100. Specifically, the components include an SDG 134, an SMSC 140, and a SIM secure datastore 156 of a communications system 130, an SMS aggregator system 180, a service portal 112 of a service provider 110, a user 174, and a user device 170 of the user 174. However, it is contemplated that other component(s) of the network system 100 may be involved in performing the operations of the method 300. In embodiments, each of the SDG 134, the SMSC 140, the SIM secure datastore 156, the SMS aggregator system 180, the service portal 112, and the user device 170 may implement the operations of the method 300 using a computer system with components as shown in FIG. 8. As illustrated, FIGS. 3A-3B include a number of enumerated operations, but embodiments of the operations in FIGS. 3A-3B may include additional operations before, after, and in between the enumerated operations. In some embodiments, one or more of the enumerated operations may be omitted or performed in a different order.

In an example, the method 300 may be implemented after the method 200 is employed to register the user 174's MSISDN 166a for 2FA, where the service provider 110 has registered and stored the user 174's MSISDN 166a and the user 174's SIM indicator 160a for 2FA. Thus, the service provider 110 may subsequently transmit an OTP message for 2FA to the registered MSISDN 166a and the registered SIM indicator 160a (e.g., stored by the service provider 110 at operation 248 of the method 200). For instance, at operation 312, the user 174 may login to the service portal 112, via the user device 170, using the user 174's credential (e.g., the username and the password).

At operation 314, upon the service portal 112 receiving the login information from the user 174, the service portal 112 may transmit, and the SMS aggregator system 180 may receive a subsequent OTP delivery request. The subsequent OTP delivery request may include a subsequent OTP message, the registered user 174's MSISDN 166a (destined to receive the subsequent OTP message), the registered SIM indicator 160a, and a request for a delivery report. In an example, the service provider 110 may generate the subsequent OTP message using a similar mechanism as described above with reference to operation 220 of the method 200. At operation 316, upon the SMS aggregator system 180 receiving the subsequent OTP delivery request, the SMS aggregator system 180 may transmit, and the SDG 134 may receive, the subsequent OTP delivery request to the SDG 134.

At operation 318, upon the SDG 134 receiving the subsequent OTP delivery request, the SDG 134 may query the SIM secure datastore 156 for an IMSI 168 of record for the SIM indicator 160a received in the subsequent OTP delivery request. At operation 320, in response to the query, the SDG 134 may receive the IMSI 168a of record linked to the SIM indicator 160a (where the IMSI 168a is associated with the user 174's MSISDN 166a at the time when the user 174 registers the MSISDN 166a for 2FA with the service provider 110).

At operation 322, the SDG 134 may compare a current IMSI 168 associated with the received MSISDN 166a against the IMSI 168a of record linked to the SIM indicator 160a. In an example, the SDG 134 may obtain the current IMSI 168 associated with the MSISDN 166a from the subscriber datastore 158 based on the MSISDN 166a.

If there is a mismatch between the current IMSI 168 associated with the received MSISDN 166a and the IMSI 168a of record linked to the SIM indicator, the operations in the dotted box 302 may be performed. For instance, at operation 324, the SDG 134 may transmit, and the SMS aggregator system 180 may receive a first delivery report including an indication of a failure to deliver the subsequent OTP message and may additionally include a reason of the failure (e.g., indicating that there is a SIM card change associated with the registered user 174's MSISDN 166a). At operation 326, upon receiving the SMS aggregator system 180 receiving the first delivery report, the SMS aggregator system 180 may transmit, and the service provider 110 may receive the first delivery report. At operation 328, upon the service provider 110 receiving the first delivery report indicating the failure, the service provider 110 may transmit, and the user 174 may receive, via the user device 170, a failure notification (e.g., for proceeding with the 2FA process).

If, however, there is a match between the current IMSI 168 associated with the received MSISDN 166a and the IMSI 168a of record linked to the SIM indicator, the operations in the dotted box 304 may be performed. For instance, at operation 340, the SDG 134 may transmit, and the SMSC 140 may receive, a request to deliver the subsequent OTP message.

At operation 342, upon the SMSC 140 receiving the request to deliver the subsequent OTP message to the MSISDN 166a, the SMSC 140 may transmit, and the user device 170 may receive, the subsequent OTP message. For instance, the SMSC 140 may obtain an IMSI 168a associated with the MSISDN 166a of the user device 170 (e.g., the IMSI 168a stored at the SIM card 172 of the user device 170) from the subscriber datastore 158 and route the subsequent OTP message to the user device 170 according to the IMSI 168a. The delivery of the subsequent OTP message may be in the form of a text message including the subsequent OTP for the 2FA.

At operation 344, upon the user device 170 successfully receiving the subsequent OTP message, the user device 170 may transmit, and the SMSC 140 may receive, a second delivery report including an indication of a successful reception of the subsequent OTP message. At operation 346, upon the SMSC 140 receiving the second delivery report, the SMSC 140 may transmit, and the SDG 134 may receive, a third delivery report including an indication of a successful delivery of the subsequent OTP message. At operation 348, upon the SDG 134 receiving the third delivery report, the SDG 134 may transmit, and the SMS aggregator system 180 may receive the third delivery report (including the successful delivery indication).

At operation 350, upon receiving the SMS aggregator system 180 receiving the third delivery report, the SMS aggregator system 180 may transmit, and the service provider 110 may receive the third delivery report (including the successful delivery indication). At operation 360, upon the service provider 110 receiving the third delivery report including the successful delivery indication, the service provider 110 may request the user 174 to read the subsequent OTP.

At operation 362, the user 174 may read the subsequent OTP from the user device 170 (e.g., in the text message received at the user device 170 at operation 342). At operation 364, the user 174 may transmit or submit, and the service portal 112 may receive, the subsequent OTP (received from the text message).

At operation 366, the service portal 112 may compare the subsequent OTP submitted by the user 174 at operation 362 and the subsequent OTP created by the service portal 112. If there is a match between the subsequent OTP submitted by the user 174 and the subsequent OTP created by the service portal 112, the operations in the dotted box 306 may be performed. For instance, at operation 368, the service portal 112 may determine that the login is successful and may proceed to allow the user 174 to access the user 174's account and receive service(s) (e.g., banking service, emailing service, etc.) from the service provider 110.

If, however, there is a mismatch between the subsequent OTP submitted by the user and the initial OTP created by the service portal 112, the operations in the dotted box 308 may be performed. At operation 370, the service portal 112 may transmit, and the user 174 may receive, via the user device 170, a failure notification (indicating that the login failed). At operation 372, the service portal 112 may determine that the user 174's login is unsuccessful and may block the user 174 from accessing any service (e.g., banking service, emailing service, etc.) of the service provider 110.

Figure 4:
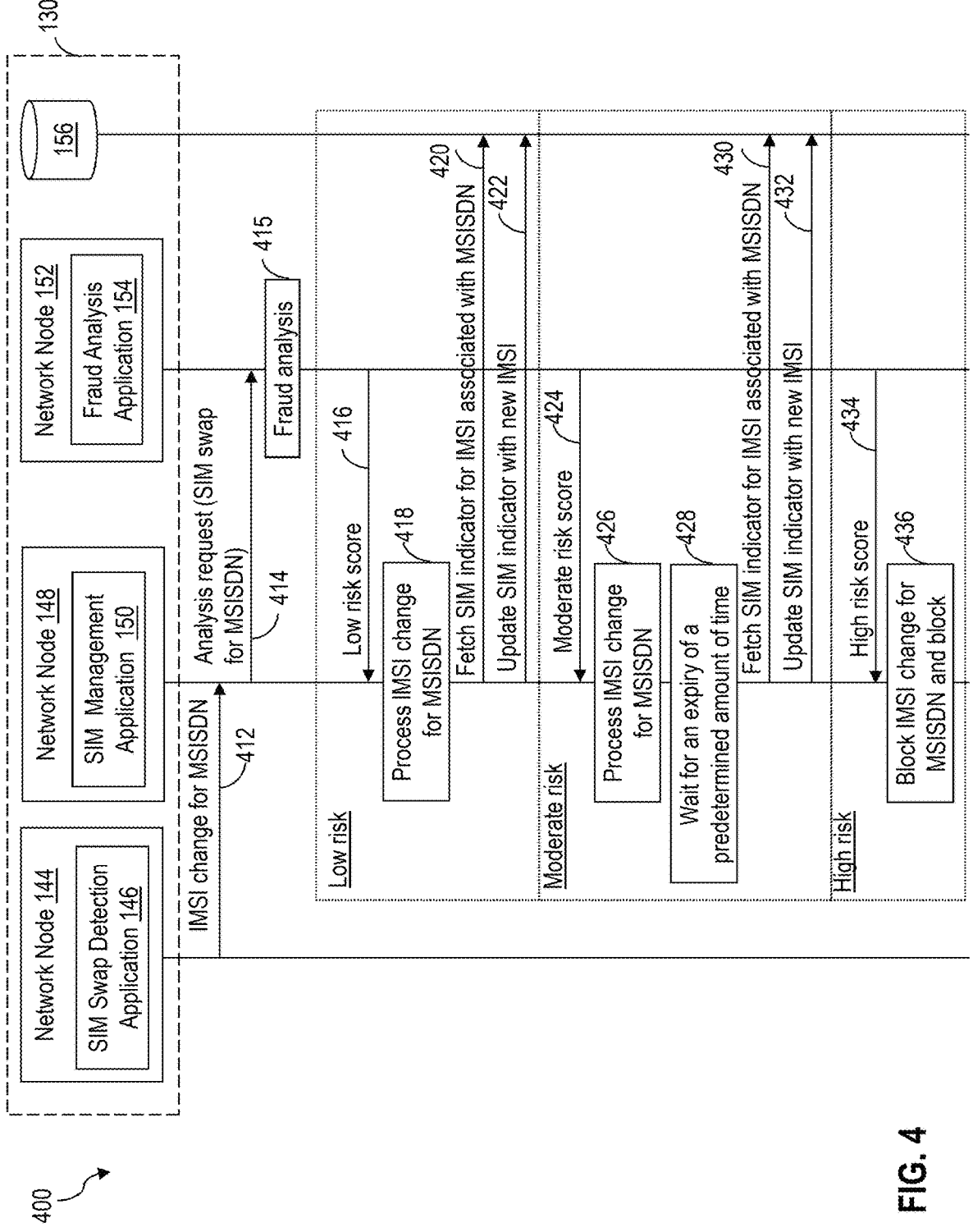
FIG. 4 is a signaling diagram illustrating an example SIM swap processing method according to an embodiment of the disclosure.

Turning now to FIG. 4, an example SIM swap processing method 400 is described. The method 400 illustrates operations performed by various components of the network system 100. Specifically, the components include network nodes 144, 148 and 152, and a SIM secure datastore 156 of a communications system 130. More specifically, the operations of the network node 144 may be implemented by a SIM swap detection application 146, the operations of the network node 148 may be implemented by a SIM management application 150, and the operations of the network node 152 may be implemented by the fraud analysis application 154. However, it is contemplated that other component(s) of the network system 100 may be involved in performing the operations of the method 400. In embodiments, each of the network nodes 144, 148, and 152 may implement the operations of the method 400 using a computer system with components as shown in FIG. 8. As illustrated, FIG. 4 includes a number of enumerated operations, but embodiments of the operations in FIG. 4 may include additional operations before, after, and in between the enumerated operations. In some embodiments, one or more of the enumerated operations may be omitted or performed in a different order.

The method 400 is described using an example when a SIM card change occurs for the user 174's MSISDN 166a. For instance, the user 174's MSISDN 166a is previously associated with the user 174's SIM card 172 having an IMSI 168a, and the SIM card change is for a new SIM card having a new IMSI 168.

At operation 412, the SIM swap detection application 146 may transmit, and the SIM management application 150 may receive an indication of a detected SIM card change for the user 174's MSISDN 166a. The indication may include the user 174's MSISDN 166a and the new IMSI 168. The SIM swap detection application 146 may utilize any suitable techniques to detect the SIM card change associated with the MSISDN 166a. In the case of a legitimate SIM swap, the user 174 may replace the original SIM card 172 with the new SIM card having the new IMSI 168 in the user device 170, and thus may call an operator of the communications system 130 to notify the operator of the SIM card change and provide the new IMSI 168 to the operator. In the case of a SIM swap fraud, a malicious actor may call an operator of the communications system 130 to notify the operator of a SIM card change associated with the user's MSISDN 166a and provide a new IMSI 168 of the malicious actor to the operator. The call or notification from the user 174 or the malicious actor may trigger a detected SIM card change at the SIM swap detection application 146. At operation 414, upon the SIM management application 150 receiving the indication of the detected SIM card change, the SIM management application 150 may transmit, and the fraud analysis application 154 may receive, an analysis request for a SIM swap risk associated with the SIM swap for the MSISDN 166a.

At operation 415, upon the fraud analysis application 154 receiving the analysis request, the fraud analysis application 154 may perform a risk analysis associated with the SIM swap for the MSISDN 166a. In an example, the risk analysis may be based on the geographical location of the user device 170 (with the original SIM card 172) and the geographical location of the caller requesting the SIM swap. The reason to use the location of the user device 170 and the location of the caller is that a legitimate caller (e.g., the user 174 of the user device 170) may be close to or next to the user device 170, whereas a malicious actor may be far away from the user device 170 (e.g., in a different city, state, or country than the user 174). As such, if the geographical location of the user device 170 and the geographical location of the caller requesting the SIM swap is close to each other (e.g., within a first threshold distance), the fraud analysis application 154 may determine that the SIM swap may be a legitimate SIM swap (e.g., a device upgrade), and thus the risk may be low. If, however, the geographical location of the user device 170 and the geographical location of the caller requesting the SIM swap is far apart (e.g., greater than a second threshold distance), the fraud analysis application 154 may determine that the SIM swap may be a SIM swap scam, and thus the risk may be high. If the geographical location of the user device 170 and the geographical location of the caller requesting the SIM swap is within a certain range of distances (e.g., between the first threshold distance and the second threshold distance) the fraud analysis application 154 may determine that the SIM swap risk may be moderate. In general, the fraud analysis application 154 may utilize any suitable techniques to determine a risk associated with a SIM swap.

The fraud analysis application 154 may provide a risk score or an indication of a risk level for the SIM swap associated with the MSISDN 166a. The level of risk, or risk score, may be a numerical value, e.g., 1 to 10, or may be a non-numerical label, such as "low," "moderate," or "high" risk. Other numerical ranges, labels, or number of labels can be used to indicate the level of risk associated with the SIM change.

In one example, the fraud analysis application 154 may determine that the SIM swap risk for the MSISDN 166a is low. Thus, at operation 416, the fraud analysis application 154 may transmit, and the SIM management application 150 may receive, a low risk score (e.g., indicating "low" or a value between 1-2 when a risk score varies between 1 and 10) for the SIM swap associated with the MSISDN 166a. At operation 418, the SIM management application 150 may process, based on the low risk score, the IMSI change for the MSISDN 166a, for example, by updating an association of the MSISDN 166a to the new IMSI 168 at the subscriber datastore 158. At operation 420, based on the low risk score, the SIM management application 150 may fetch a SIM indicator 160 for the new IMSI 168 associated with the MSISDN 166a. At operation 422, the SIM management application 150 may update the SIM secure datastore 156 to associate the SIM indicator 160 to the new IMSI 168. That is, the SIM indicator-IMSI association for the SIM indicator 160 in the SIM secure datastore 156 is updated from associating with the previous IMSI 168a to the new IMSI 168. Because the MSISDN-IMSI association for the MSISDN 166a is updated to associate with the new IMSI 168 and the SIM indicator-IMSI association for the SIM indicator 160 is updated to associate to the new IMSI 168, the user 174 may continue to use the user 174's MSISDN 166a for 2FA with the service provider without having to re-register with the service provider. For instance, the user 174 may continue to use the user 174's MSISDN 166a for 2FA with the service provider 110 using the method 300 without having to repeat the method 200 as will be discussed more fully below with reference to FIG. 5.

As another example, the fraud analysis application 154 may determine that the SIM swap risk for the MSISDN 166a is moderate. Thus, at operation 424, the fraud analysis application 154 may transmit, and the SIM management application 150 may receive, a moderate risk score (e.g., indicating "moderate" or a value between 3-8 when a risk score varies between 1 and 10) for the SIM swap associated with the MSISDN 166a. At operation 426, based on the moderate risk score, the SIM management application 150 may process the IMSI change for the MSISDN 166a, e.g., by updating an association of the MSISDN 166a to the new IMSI 168 at the subscriber datastore 158. Further, at operation 428, based on the moderate risk score, the SIM management application 150 may wait for an expiry of a predetermined amount of time before updating the SIM secure datastore 156 to associate the SIM indicator 160 to the new IMSI 168. Upon an expiry of the predetermined amount of time, the SIM management application 150 may perform operations 430 and 432, which may be similar to the operations 420 and 422, respectively, to update the SIM secure datastore 156 to associate the SIM indicator 160 to the new IMSI 168. If the user 174 attempts to use 2FA with the service provider 110 prior to the expiry of the predetermined amount of time, the user 174 may have to re-register the user 174's MSISDN 166a for 2FA with the service provider 110 (e.g., using the method 200). If user 174 attempts to use 2FA with the service provider 110 after the expiry of the predetermined amount of time, the user 174 may not have to re-register for 2FA with the service provider 110.

In an embodiment, when the risk score is a numerical value (e.g., varying between 1 and 10, where the higher the value the higher the risk), the predetermined amount of time may be longer for a higher risk score value. For instance, the predetermined amount of time may be 96 hours for a risk score between 7 and 8, 48 hours for a risk score between 5 and 6, and 24 hours for a risk score between 3-4. In some embodiments, the operations 428-432 may be omitted. In other words, when the risk score for the SIM change associated with the MSISDN 166a is moderate, the SIM management application 150 may not update the SIM secure datastore 156 to associate the SIM indicator 160 to the new IMSI 168.

As a further example, the fraud analysis application 154 may determine that the SIM swap risk for the MSISDN 166a is high. Thus, at operation 434, the fraud analysis application 154 may transmit, and the SIM management application 150 may receive, a high risk score (e.g., indicating "high" or a value between 9-10 when a risk score varies between 1 and 10) for the SIM swap associated with the MSISDN 166a. At operation 436, based on the high risk score, the SIM management application 150 may block the IMSI change for the MSISDN 166a. The SIM management application 150 may also block the IMSI change for the SIM indicator 160.

Turning now to FIG. 5, a method 500 is described. In an embodiment, the method 500 is a method for performing 2FA after a SIM change associated with the MSISDN 166a occurred in which the SIM secure datastore 156 and the subscriber datastore 158 are updated (e.g., based on a low risk or a moderate risk using the method 400). The method 500 may include similar mechanisms as discussed above with reference to FIGS. 1, 3A-3B. In embodiments, the method 500 may be implemented using a computer system with components as shown in FIG. 8. In embodiments, the method 500 is implemented by the SIM secure application 136 at the SDG 134 of the communications system 130. As illustrated, FIG. 5 includes a number of enumerated operations, but embodiments of the operations in FIG. 5 may include additional operations before, after, and in between the enumerated operations. In some embodiments, one or more of the enumerated operations may be omitted or performed in a different order.

In embodiments, a datastore 156 (e.g., the SIM secure datastore) may be initially configured to store a SIM indicator 160 in association with a first IMSI 168 recorded for an MSISDN 166, where the first IMSI 168 is of a first SIM card 172. The SIM indicator 160 and the MSISDN 166 are registered to a 2FA with a service provider 110 (e.g., as discussed above with reference to FIG. 2). The method 500 is implemented after a SIM change (e.g., a legitimate SIM change) has occurred for the MSISDN 166, where the datastore 156 is updated to associate the SIM indicator 160 with a second IMSI 168 (e.g., a new IMSI) of a second SIM card 172. Because the SIM indicator 160 is updated to associate with the second IMSI after the SIM change (e.g., automatically when the SIM change risk is low or after a delay when the SIM change risk is moderate as discussed above with reference to FIG. 4), there is no need for the user 174 to re-register for 2FA with the service provider 110.

At block 502, the SIM secure application 136 receives, from the service provider after the datastore 156 is updated, an OTP delivery request including an OTP message, the MSISDN 166 destined to receive the OTP message, and the SIM indicator 160 associated with the MSISDN 166. The OTP delivery request is associated with the same 2FA registration with the service provider 110 (e.g., where the registration occurs when the MSISDN 166a is associated with the first IMIS 168). At block 504, the SIM secure application 136 determines, based on the OTP delivery request, a current IMSI 168 associated with the MSISDN 166a destined to receive the OTP message.

At block 506, the SIM secure application 136 obtains, from the updated datastore 156, based on the SIM indicator 160 in the OTP delivery request, the second IMSI 168. At block 508, the SIM management application 150 delivers, based on a match between the current IMSI 168 associated with the MSISDN 166 destined to receive the OTP message and the second IMSI 168 obtained from the updated datastore 156, the OTP message to a user device 170 associated with the MSISDN 166.

Figure 6:
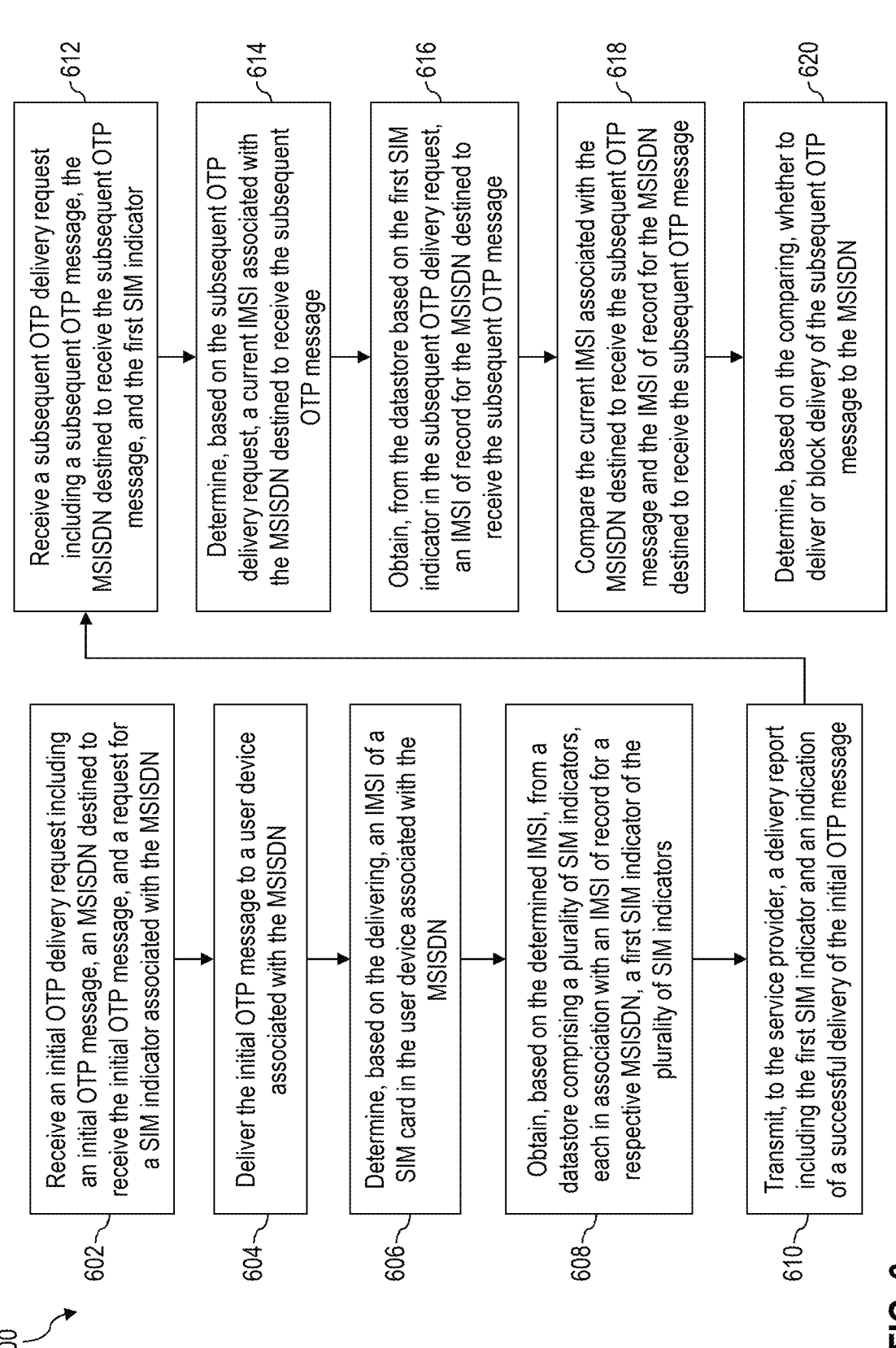
FIG. 6 is a flow chart of another method according to an embodiment of the disclosure.

Turning now to FIG. 6, a method 600 is described. In an embodiment, the method 600 is a method for utilizing a SIM card 172 as a security key for SIM swap fraud prevention. The method 600 may include similar mechanisms as discussed above with reference to FIGS. 1, 2A-2B, and 3A-3B. In embodiments, the method 600 may be implemented using a computer system with components as shown in FIG. 8. In embodiments, the method 600 is implemented by the SIM secure application 136 at the SDG 134 of the communications system 130. As illustrated, FIG. 6 includes a number of enumerated operations, but embodiments of the operations in FIG. 6 may include additional operations before, after, and in between the enumerated operations. In some embodiments, one or more of the enumerated operations may be omitted or performed in a different order.

At block 602, the SIM secure application 136 receives, from a service provider 110, an initial OTP delivery request including an initial OTP message, an MSISDN 166 destined to receive the initial OTP message, and a request for a SIM indicator 160 associated with the MSISDN 166. The initial OTP delivery request is based on a registration of the MSISDN 166 for 2FA with the service provider 110.

At block 604, the SIM secure application 136 delivers the initial OTP message to a user device 170 associated with the MSISDN 166. At block 606, the SIM secure application 136 determines, based on the delivering at block 604, an IMSI 168 of a SIM card 172 in the user device 170 associated with the MSISDN 166. At block 608, the SIM secure application 136 obtains, based on the determined IMSI at block 606, from a datastore 156 including a plurality of SIM indicators 160, each in association with an IMSI 168 of record for a respective MSISDN 166, a first SIM indicator 160 of the plurality of SIM indicators 160.

At block 610, the SIM secure application 136 transmits, to the service provider 110, a delivery report including the first SIM indicator 160 (associated with the MSISDN 166) and an indication of a successful delivery of the initial OTP message. At block 612, the SIM secure application receives, from the service provider 110, a subsequent OTP delivery request including a subsequent OTP message, the MSISDN 166 destined to receive the subsequent OTP message, and the first SIM indicator 160 (associated with the MSISDN 166). At block 614, the SIM secure application 136 determines, based on the subsequent OTP delivery request, a current IMSI 168 associated with the MSISDN 166 destined to receive the subsequent OTP message.

At block 616, the SIM secure application 136 obtains, from the datastore 156 based on the first SIM indicator 160 in the subsequent OTP delivery request, an IMSI 168 of record for the MSISDN 166 destined to receive the subsequent OTP message. In an embodiment, as part of obtaining the IMSI of record for the MSISDN destined to receive the subsequent OTP message, the SIM secure application 136 indexes into the datastore 156 using the first SIM indicator 160. In an embodiment, as part of obtaining the IMSI 168 of record for the MSISDN 166 destined to receive the subsequent OTP message includes queries of the datastore 156 for an IMSI 168 of record associated with the first SIM indicator 160 in the subsequent OTP delivery request, and in response, the SIM secure application 136 receives, from the datastore 156, the IMSI 168 of record associated with the first SIM indicator 160. At block 618, the SIM secure application 136 compares the current IMSI 168 associated with the MSISDN 166 destined to receive the subsequent OTP message and the IMSI 168 of record for the MSISDN 166 destined to receive the subsequent OTP message.

At block 620, the SIM secure application 136 determines, based on the comparing at block 618, whether to deliver the subsequent OTP message to the MSISDN 166 or block delivery of the subsequent OTP message to the MSISDN 166. In an embodiment, the SIM secure application 136 may determine to deliver the subsequent OTP message to the MSISDN 166 based on a match between the current IMSI 168 associated with the MSISDN 166 and the IMSI 168 of record for the MSISDN 166. For instance, the SIM secure application 136 further delivers, based on the match, the subsequent OTP message to the user device 170 associated with the MSISDN 166. In an embodiment, as part of delivering the subsequent OTP message to the user device 170 associated with the MSISDN 166, the SIM secure application 136 further transmits, to an SMSC 140, a request to deliver the initial OTP message to the MSISDN 166. In an embodiment, the SIM secure application 136 further receives, from the SMSC 140, based on the request to deliver the subsequent OTP message to the MSISDN 166, an indication of a successful delivery of the subsequent OTP message. The SIM secure application 136 further transmits, to the service provider 110, a second delivery report including the indication of the successful delivery of the subsequent OTP message.

In an embodiment, the SIM secure application 136 may determine to block the delivery of the subsequent OTP message to the MSISDN 166 based on a mismatch between the current IMSI 168 associated with the MSISDN 166 and the IMSI 168 of record for the MSISDN 166. For instance, the SIM secure application 136 further blocks, based on the mismatch, delivery of the subsequent OTP message to the MSISDN. In an embodiment, the SIM secure application 136 further transmits, to the service provider 110 based on the blocking, a second delivery report including an indication of a failure to deliver the subsequent OTP message to the MSISDN 166. In an embodiment, the second delivery report further includes an indication that the failure to deliver the subsequent OTP message is due to a SIM change associated with the MSISDN 166.

Turning now to FIG. 7, a method 700 is described. In an embodiment, the method 700 is a method for providing datastore management (e.g., for the SIM secure datastore 156 and the subscriber datastore 158) for SIM swap fraud prevention that utilizes a SIM card 172 as a security key. The method 700 may include similar mechanisms as discussed above with reference to FIG. 4. In embodiments, the method 700 may be implemented using a computer system with components as shown in FIG. 8. In embodiments, the method 700 is implemented by the SIM management application 150 at a first network node 148 (e.g., a service node) of the communications system 130. As illustrated, FIG. 7 includes a number of enumerated operations, but embodiments of the operations in FIG. 7 may include additional operations before, after, and in between the enumerated operations. In some embodiments, one or more of the enumerated operations may be omitted or performed in a different order.

In embodiments, a datastore 156 (e.g., the SIM secure datastore) may be configured to store a SIM indicator 160 in association with a first IMSI 168 recorded for an MSISDN 166 registered for 2FA with a service provider. At block 702, the SIM management application 150 receives, from a second network node 152, a first risk score for a first SIM change associated with the MSISDN 166. The first SIM change is associated with a second IMSI 168 of a second SIM card 172 different than the first SIM card 172.

At block 704, the SIM management application 150 updates, based on the first risk score associated with the first SIM change satisfying a first criterion, the datastore 156 to associate the SIM indicator 160 with the second IMSI 168 after an expiry of a first predetermined amount of time. In an example, the SIM management application 150 may configure a timer with a duration corresponding to the first predetermined amount of time. Upon an expiration of the timer, the SIM management application 150 may update the datastore 156 to associate the SIM indicator 160 with the second IMSI 168. At block 706, the SIM management application 150 receives, from the second network node 152, a second risk score for a second SIM change associated with the MSISDN 166, where the second SIM change is associated with a third IMSI 168 of a third SIM card 172 different than the first SIM card 172.

At block 708, the SIM management application 150 updates, based on the second risk score associated with the second SIM change satisfying a second criterion but failing to satisfy the first criterion, the datastore 156 to associate the SIM indicator 160 with the third IMSI 168 after an expiry of a second predetermined amount of time greater (or longer) than the first predetermined amount of time. In an example, the first criterion includes a first threshold, and the second criterion comprises a second threshold lower than the first threshold. In an example, the SIM management application 150 may configure a timer with a duration corresponding to the second predetermined amount of time. Upon an expiration of the timer, the SIM management application 150 may update the datastore 156 to associate the SIM indicator 160 with the third IMSI 168.

In an embodiment, the SIM management application 150 further receives, from the second network node 152, a third risk score for a third SIM change associated with the MSISDN 166, wherein the third SIM change is associated with a fourth IMSI 168 of a fourth SIM card 172 different than the first SIM card 172. Based on the third risk score associated with the third SIM change failing to satisfy the first criterion and the second criterion (e.g., corresponding to a high-risk SIM swap such as a SIM swap scam), the SIM management application 150 further blocks updating the association between the SIM indicator and the first IMSI in the datastore.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, RAM 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, USB interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as CDMA, global system for mobile communications (GSM), LTE, WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communications system to provide datastore management for SIM swap fraud prevention that utilizes a subscriber identity module (SIM) card at a user device as a security key, the system comprising:

a datastore to store a SIM indicator in association with a first international mobile subscriber identity (IMSI) recorded for a mobile station international subscriber directory number (MSISDN) registered for 2FA with a service provider, wherein the first IMSI is associated with a first SIM card; and a first network node comprising:

at least one processor;

at least one non-transitory memory; and a SIM management application comprising instructions stored at the at least one non-transitory memory, which when executed by the at least one processor, causes the SIM management application to:

receive, from a second network node, a first risk score for a first SIM change associated with the MSISDN, wherein the first SIM change is associated with a second IMSI of a second SIM card different than the first SIM card;

update, based on the first risk score associated with the first SIM change satisfying a first criterion, the datastore to associate the SIM indicator with the second IMSI after an expiry of a first predetermined amount of time;

receive, from the second network node, a second risk score for a second SIM change associated with the MSISDN, wherein the second SIM change is associated with a third IMSI of a third SIM card different than the first SIM card; and update, based on the second risk score associated with the second SIM change satisfying a second criterion but failing to satisfy the first criterion, the datastore to associate the SIM indicator with the third IMSI after an expiry of a second predetermined amount of time greater than the first predetermined amount of time.

2. The system of claim 1, wherein the first criterion comprises a first threshold, and wherein the second criterion comprises a second threshold lower than the first threshold.

3. The system of claim 1, wherein the SIM management application is further caused to:

receive, from the second network node, a third risk score for a third SIM change associated with the MSISDN, wherein the third SIM change is associated with a fourth IMSI of a fourth SIM card different than the first SIM card; and block, based on the third risk score associated with the third SIM change failing to satisfy the first criterion and the second criterion, updating the association between the SIM indicator and the first IMSI in the datastore.

4. The system of claim 1, wherein the SIM management application is further caused to:

receive, from a third network node, an indication of the first SIM change associated with the MSISDN;

transmit, to a fourth network node, an analysis request for the first SIM change associated with the MSISDN; and receive, from the fourth network node, the first risk score.

5. The system of claim 1, further comprising:

a second datastore to store the MSISDN in association with the first IMSI of the first SIM card, wherein the SIM management application is further caused to:

update, based on the first risk score associated with the first SIM change satisfying the first criterion, the second datastore to associate the MSISDN with the second IMSI; and update, based on the second risk score associated with the second SIM change satisfying the second criterion, the second datastore to associate the MSISDN with the third IMSI.

6. A communications system to provide subscriber identity module (SIM) swap fraud prevention without a two-factor authentication (2FA) re-registration upon a legitimate SIM change, the system comprising:

a datastore to store a SIM indicator in association with a first international mobile subscriber identity (IMSI) recorded for a mobile station international subscriber directory number (MSISDN), wherein the first IMSI is associated with a first SIM card, wherein the SIM indicator and the MSISDN are associated with a 2FA registration with a service provider;

a first network node comprising:

at least one first processor;

at least one first non-transitory memory; and a SIM management application comprising instructions stored at the at least one first non-transitory memory, which when executed by the at least one first processor, causes the SIM management application to:

determine that a level of risk for a SIM change associated with the MSISDN satisfies a threshold, wherein the SIM change is further associated with a second IMSI of a second SIM card different than the first SIM card; and update, based on the determining, the datastore to associate the SIM indicator with the second IMSI, a second network node comprising:

at least one second processor;

at least one second non-transitory memory; and a SIM secure application comprising instructions stored at the at least one second non-transitory memory, which when executed by the at least one second processor, causes the SIM secure application to:

receive, from the service provider after the datastore is updated, an OTP delivery request comprising an OTP message, the MSISDN destined to receive the OTP message, and the SIM indicator associated with the MSISDN, wherein the OTP delivery request is associated with the same 2FA registration with the service provider;

determine, based on the OTP delivery request, a current IMSI associated with the MSISDN destined to receive the OTP message;

obtain, from the updated datastore, based on the SIM indicator in the OTP delivery request, the second IMSI; and deliver, based on a match between the current IMSI associated with the MSISDN destined to receive the OTP message and the second IMSI obtained from the updated datastore, the OTP message to a user device associated with the MSISDN.

7. The system of claim 6, wherein the SIM management application is further caused to:

transmit, to a third network node, an analysis request for the SIM change associated with the MSISDN; and receive, from the third network node in response to the analysis request, an indication of the level of risk for the SIM change associated with the MSISDN.

8. The system of claim 6, wherein the delivering the OTP message to the user device associated with the MSISDN comprises:

transmitting, to a third network node, a request to deliver the OTP message to the MSISDN.

9. The system of claim 6, further comprising a second datastore to store the MSISDN in association with the first IMSI of the first SIM card, wherein the SIM management application is further caused to update, based on the level of risk for the SIM change associated with the MSISDN satisfying the threshold, the second datastore to associate the MSISDN with the second IMSIS of the second SIM card, and wherein the determining the IMSI associated with the MSISDN destined to receive the OTP message is based on the updated second datastore that associates the MSISDN with the second IMSI of the second SIM card.

10. The system of claim 6, wherein the SIM management application is further caused to:

generate the SIM indicator based on an absence of a SIM indicator associated with the first IMSI at the datastore; and store, at the datastore, the SIM indicator in association with the first IMSI.

11. The system of claim 6, wherein the first network node comprises a service delivery gateway (SDG).

12. A method implemented in a communications system to utilize a subscriber identity module (SIM) card at a user device as a security key for SIM swap fraud prevention, the method comprising:

receiving, by a SIM secure application at a computing system comprising a service delivery gateway (SDG) of the communications system, from a service provider, an initial one-time password (OTP) delivery request comprising an initial OTP message, a mobile station international subscriber directory number (MSISDN) destined to receive the initial OTP message, and a request for a SIM indicator associated with the MSISDN, wherein the initial OTP delivery request is based on a registration of the MSISDN for second factor authentication (2FA) with the service provider;

delivering, by the SIM secure application, the initial OTP message to a user device associated with the MSISDN;

determining, by the SIM secure application based on the delivering, an international mobile subscriber identity (IMSI) of a SIM card in the user device associated with the MSISDN;

obtaining, by the SIM secure application, based on the determined IMSI, from a datastore comprising a plurality of SIM indicators, each in association with an IMSI of record for a respective MSISDN, a first SIM indicator of the plurality of SIM indicators;

transmitting, by the SIM secure application to the service provider, a delivery report including the first SIM indicator and an indication of a successful delivery of the initial OTP message;

receiving, by the SIM secure application from the service provider, a subsequent OTP delivery request comprising a subsequent OTP message, the MSISDN destined to receive the subsequent OTP message, and the first SIM indicator;

determining, by the SIM secure application based on the subsequent OTP delivery request, a current IMSI associated with the MSISDN destined to receive the subsequent OTP message;

obtaining, by the SIM secure application, from the datastore based on the first SIM indicator in the subsequent OTP delivery request, an IMSI of record for the MSISDN destined to receive the subsequent OTP message;

comparing, by the SIM secure application, the current IMSI associated with the MSISDN destined to receive the subsequent OTP message and the IMSI of record for the MSISDN destined to receive the subsequent OTP message; and determining, by the SIM secure application, based on the comparing, whether to deliver the subsequent OTP message to the MSISDN or block delivery of the subsequent OTP message to the MSISDN.

13. The method of claim 12, further comprising:

delivering, by the SIM secure application, based on a match between the current IMSI associated with the MSISDN and the IMSI of record for the MSISDN, the subsequent OTP message to the user device associated with the MSISDN.

14. The method of claim 13, wherein the delivering the subsequent OTP message to the user device associated with the MSISDN comprises:

transmitting, by the SIM secure application to a short message service center (SMSC) of the communications system, a request to deliver the initial OTP message to the MSISDN.

15. The method of claim 14, further comprising:

receiving, by the SIM secure application from the SMSC, based on the request to deliver the subsequent OTP message to the MSISDN, an indication of a successful delivery of the subsequent OTP message; and transmitting, by the SIM secure application to the service provider, a second delivery report including the indication of the successful delivery of the subsequent OTP message.

16. The method of claim 12, further comprising:

blocking, by the SIM secure application, based on a mismatch between the current IMSI associated with the MSISDN and IMSI of record for the MSISDN, delivery of the subsequent OTP message to the MSISDN.

17. The method of claim 16, further comprising:

transmitting, by the SIM secure application to the service provider based on the blocking, a second delivery report including an indication of a failure to deliver the subsequent OTP message to the MSISDN.

18. The method of claim 17, wherein the second delivery report further comprises an indication that the failure to deliver the subsequent OTP message is due to a SIM change associated with the MSISDN.

19. The method of claim 12, wherein the obtaining the IMSI of record for the MSISDN destined to receive the subsequent OTP message comprises:

indexing into the datastore using the first SIM indicator.

20. The method of claim 12, wherein the obtaining the IMSI of record for the MSISDN destined to receive the subsequent OTP message comprises:

querying, by the SIM secure application, the datastore for an IMSI of record associated with the first SIM indicator in the subsequent OTP delivery request; and receiving, by the SIM secure application, from the datastore, the IMSI of record associated with the first SIM indicator.

* * * * *